(12) United States Patent
Sundaram et al.

(10) Patent No.: US 9,049,024 B2
(45) Date of Patent: *Jun. 2, 2015

(54) SECURE KEY MANAGEMENT IN CONFERENCING SYSTEM

(75) Inventors: Ganapathy S. Sundaram, Hillsborough, NJ (US); Violeta Cakulev, Milburn, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/596,823

(22) Filed: Aug. 28, 2012

(65) Prior Publication Data

US 2012/0322416 A1    Dec. 20, 2012

Related U.S. Application Data

(63) Continuation of application No. 12/549,907, filed on Aug. 28, 2009, now Pat. No. 8,301,883.

(51) Int. Cl.
*H04M 3/42* (2006.01)
*H04L 9/30* (2006.01)
(Continued)

(52) U.S. Cl.
CPC ............ *H04L 9/3073* (2013.01); *H04L 9/0825* (2013.01); *H04L 9/0833* (2013.01); *H04L 9/0847* (2013.01); *H04L 63/306* (2013.01); *H04L 2209/80* (2013.01)

(58) Field of Classification Search
CPC .... H04M 3/56; H04M 3/568; H04L 63/0428; H04L 9/08; H04L 63/065
USPC .................. 713/162, 163; 380/270, 277, 278; 379/202.01
See application file for complete search history.

(56) References Cited

U.S. PATENT DOCUMENTS 6,195,751 B1 * 2/2001 Caronni et al. ............... 713/163
2002/0073229 A1    6/2002 Hayashi
(Continued)

FOREIGN PATENT DOCUMENTS

EP    0952718 A2    10/1999
JP    8018552 A    1/1996
(Continued)

OTHER PUBLICATIONS

Mari Ozaki, Ryuichi Sakai, Masao Kasahara, New Key Generation Scheme for Identity based Public key Encryption, The 31st Symposium on Information Theory and its Applications [CD-ROM] (SITA 2008), Japan, Society of Information Theory and its Applications, Oct. 10, 2008, 4.2.3, pp. 404-408.

(Continued)

*Primary Examiner* — Simon King
(74) *Attorney, Agent, or Firm* — Ryan, Mason & Lewis, LLP

(57) ABSTRACT

A method for managing a conference between two or more parties comprises an identity based authenticated key exchange between a conference management element and each of the two or more parties seeking to participate in the conference. Messages exchanged between the conference management element and the two or more parties are encrypted based on respective identities of recipients of the messages. The method comprises the conference management element receiving from each party a random group key component. The random group key component is computed by each party based on a random number used by the party during the key authentication operation and random key components computed by a subset of others of the two or more parties seeking to participate in the conference. The conference management element sends to each party the random group key components computed by the parties such that each party can compute the same group key.

30 Claims, 15 Drawing Sheets

(51) Int. Cl.
H04L 9/08 (2006.01)
H04L 29/06 (2006.01)

(56) References Cited

U.S. PATENT DOCUMENTS

2005/0044365 A1  2/2005  Haukka et al.
2007/0297418 A1  12/2007  Lee
2009/0034742 A1  2/2009  Appenzeller et al.

FOREIGN PATENT DOCUMENTS

| JP | 2005500740 A | 1/2005 |
|---|---|---|
| WO | 2009/089738 A | 7/2009 |
| WO | PCTUS2010/046342 | 12/2010 |
| WO | PCTUS2010046319 | 10/2011 |

OTHER PUBLICATIONS

Toru Inoue, Kohichi Sakurai, "Proposal of conference key sharing method provided with key escrow function," Symposium on Cryptography and Information Security in 2001, Japan, Technical Group on Security of Institute of Electronics, Information and Communication Engineers, Jan. 23, 2001, vol. II of II, pp. 827-832.
Ryuichi Sakai, Kiyoshi Ohgishi, Masao Kasahara, "Cryptographic Schemes based on Pairing over Elliptic Curve," Symposium on Cryptography and Information Security in 2001, Japan, Technical Group on Security of Institute of Electronics, Information and Communication Engineers, Jan. 23, 2001, vol. I of II, pp. 369-373.
"Search report of current situation of personal authentication technique," Japan, Information-technology Promotion Agency Security center [Online, Mar. 2003], pp. 13-18, [Searching on Aug. 17, 2012], Internet, URL, <http://www.ipa.go.jp/security/fy14/reports/authentication/authentication 2002.pdf>.
Kiyoshi Ohgishi, Ryuichi Sakai, Masao Kasahara, "Notes on ID-based Key Sharing Systems over Elliptic Curve," Technical report of IEICE, Japan, The Institute of Electronics, Information, and Communication Engineers, Nov. 8, 1999, vol. 99, No. 414, pp. 37-42.
V. Cakulev, G Sundaram, "IBAKE: Identity-Based Authenticated Key Agreement," Network Working Group Internet-Draft, [online], Oct. 19, 2009, draft-cakulev-ibake-00.txt, [retrieved on Jul. 11, 2013]. Retrieved from the Internet, URL, <http://tools.ietf.org/pdf/draft-cakulev-ibake-00.pdf>.
V. Cakulev, G Sundaram, "MIKEY-IBAKE: Identity-Based Mode of Key Distribution in Multimedia Internet KEYing (MIKEY)," Network Working Group Internet-Draft, [online], Oct. 14, 2009, draft-cakulev-mikey-ibake-00.txt, [retrieved on Jul. 11, 2013]. Retrieved from the Internet, URL, <http://tools.ietf.org/pdf/draft-cakulev-mikey-00.pdf>.
3GPP (3rd Generation Partnership Project) Technical Report TR 33.828, V1.5.0, Sep. 2009, 68 pages.
D. Boneh et al., "Identity-Based Encryption from the Weil Pairing," CRYPTO 2001, Lecture Notes in Computer Science, 2001, pp. 213-229, vol. 2139.
International Telecommunication Union, Telecommunication Standardization Sector of ITU (ITU-T) Recommendation H.323, Series H: Audiovisual and Multimedia Systems, Jun. 2006, 304 pages.
J. Rosenberg et al., "SIP: Session Initiation Protocol," Internet Engineering Task Force IETF RFC 3261, Jun. 2002, 270 pages.
3GPP (3rd Generation Partnership Project) Technical Specification TS 23.218, V8.4.0, Dec. 2008, 65 pages.
3GPP (3rd Generation Partnership Project) Technical Specification TS 23.228, V9.1.0, Sep. 2009, 252 pages.
3GPP (3rd Generation Partnership Project) Technical Specification TS 24.228, V5.15.0, Sep. 2006, 851 pages.
3GPP (3rd Generation Partnership Project) Technical Specification TS 24.229, V9.1.0, Sep. 2009, 623 pages.
3GPP (3rd Generation Partnership Project) Technical Report TR 24.930, V8.2.0, Dec. 2008, 140 pages.
T. Dierks et al., "The TLS Protocol, Version 1.0," Internet Engineering Task Force IETF RFC 2246, Jan. 1999, 81 pages.
M. Baugher et al., "The Secure Real-Time Transport Protocol (SRTP)," Internet Engineering Task Force IETF RFC 3711, Mar. 2004, 56 pages.
B. Ramsdell, "S/MIME Version 3 Message Specification," Internet Engineering Task Force IETF RFC 2633, Jun. 1999, 32 pages.
S. Kent et al., "IP Encapsulating Security Payload (ESP)," Internet Engineering Task Force IETF RFC 2406, Nov. 1998, 23 pages.
D. Harkins et al., "The Internet Key Exchange (IKE)," Internet Engineering Task Force IETF RFC 2409, Nov. 1998, 42 pages.
C. Kaufman, "Internet Key Exchange (IKEv2) Protocol," Internet Engineering Task Force IETF RFC 4306, Dec. 2005, 99 pages.
P. Hoffman, "Cryptographic Suites for IPsec," Internet Engineering Task Force IETF RFC 4308, Dec. 2005, 7 pages.
3GPP (3rd Generation Partnership Project) Technical Specification TS 33.220, V9.0.0, Jun. 2009, 75 pages.
X. Boyen et al., "Identity-Based Cryptography Standard (IBCS) #1: Supersingular Curve Implementations of the BF and BB1 Cryptosystems," Internet Engineering Task Force IETF RFC 5091, Dec. 2007, 59 pages.
G. Appenzeller et al., "Identity-Based Encryption Architecture and Supporting Data Structures," Internet Engineering Task Force IETF RFC 5408, Jan. 2009, 31 pages.
L. Martin et al., "Using the Boneh-Franklin and Boneh-Boyer Identity-Based Encryption Algorithms with the Cryptographic Message Syntax (CMS)," Internet Engineering Task Force IETF RFC 5409, Jan. 2009, 10 pages.
U.S. Appl. No. 12/372,242 filed in the name of Ganapathy S. Sundaram on Feb. 17, 2009 and entitled "Identity Based Authenticated Key Agreement Protocol."
V. Boyko et al., "Provably Secure Password-Authenticated Key Exchange Using Diffie-Hellman," EuroCrypt 2000, pp. 157-172.
Xun Yi, "Identity-Based Fault-Tolerant Conference Key Agreement," IEEE Transactions on Dependable and Secure Computing, Jul.-Sep. 2004, pp. 170-178, vol. 1, No. 3.
Maarit Hietalahti, "A Clustering-Based Group Key Agreement Protocol for Ad-Hoc Networks," Electronic Notes in Theoretical Computer Science, May 2008, pp. 43-53, vol. 192, No. 2.

* cited by examiner

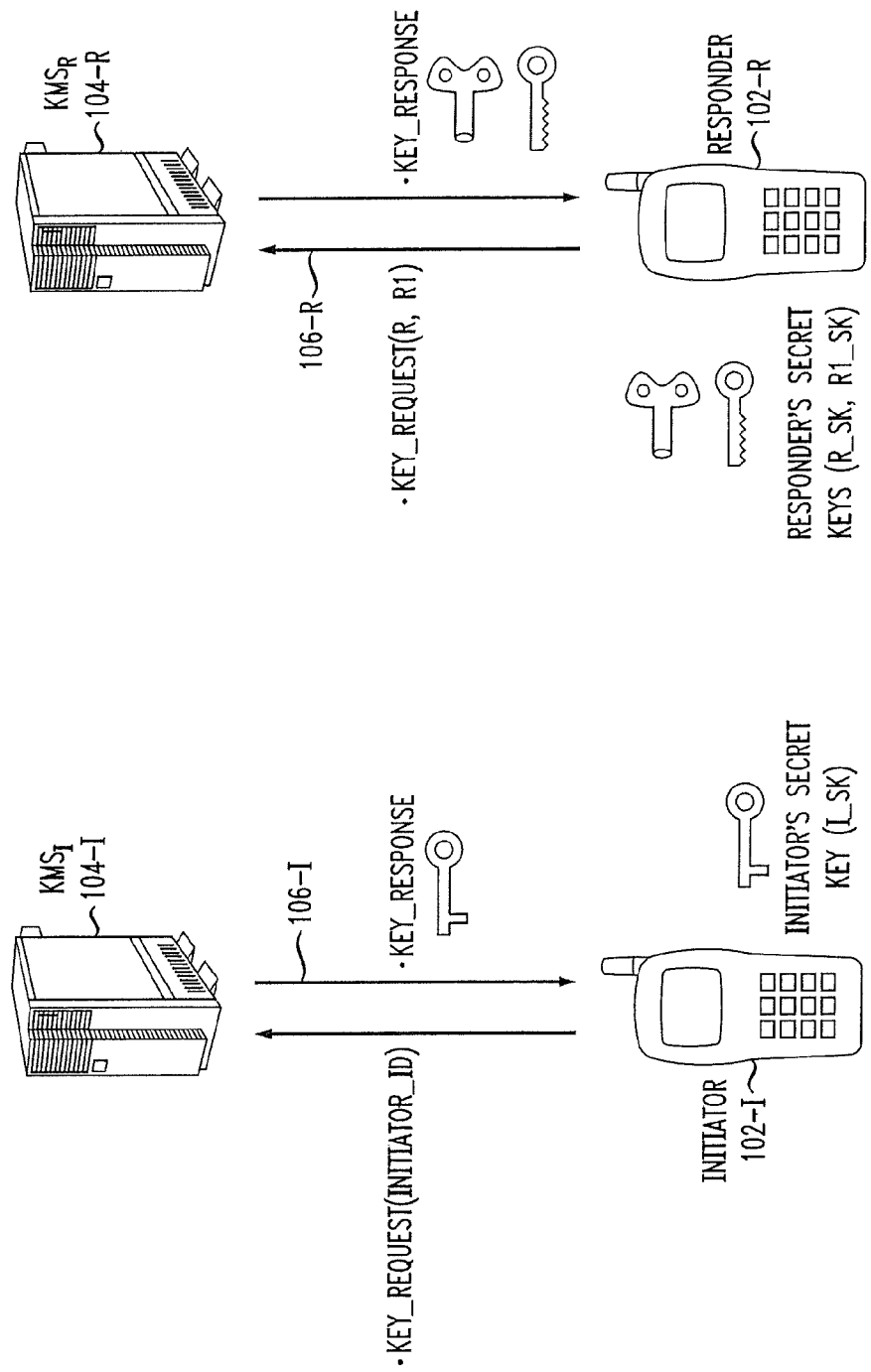

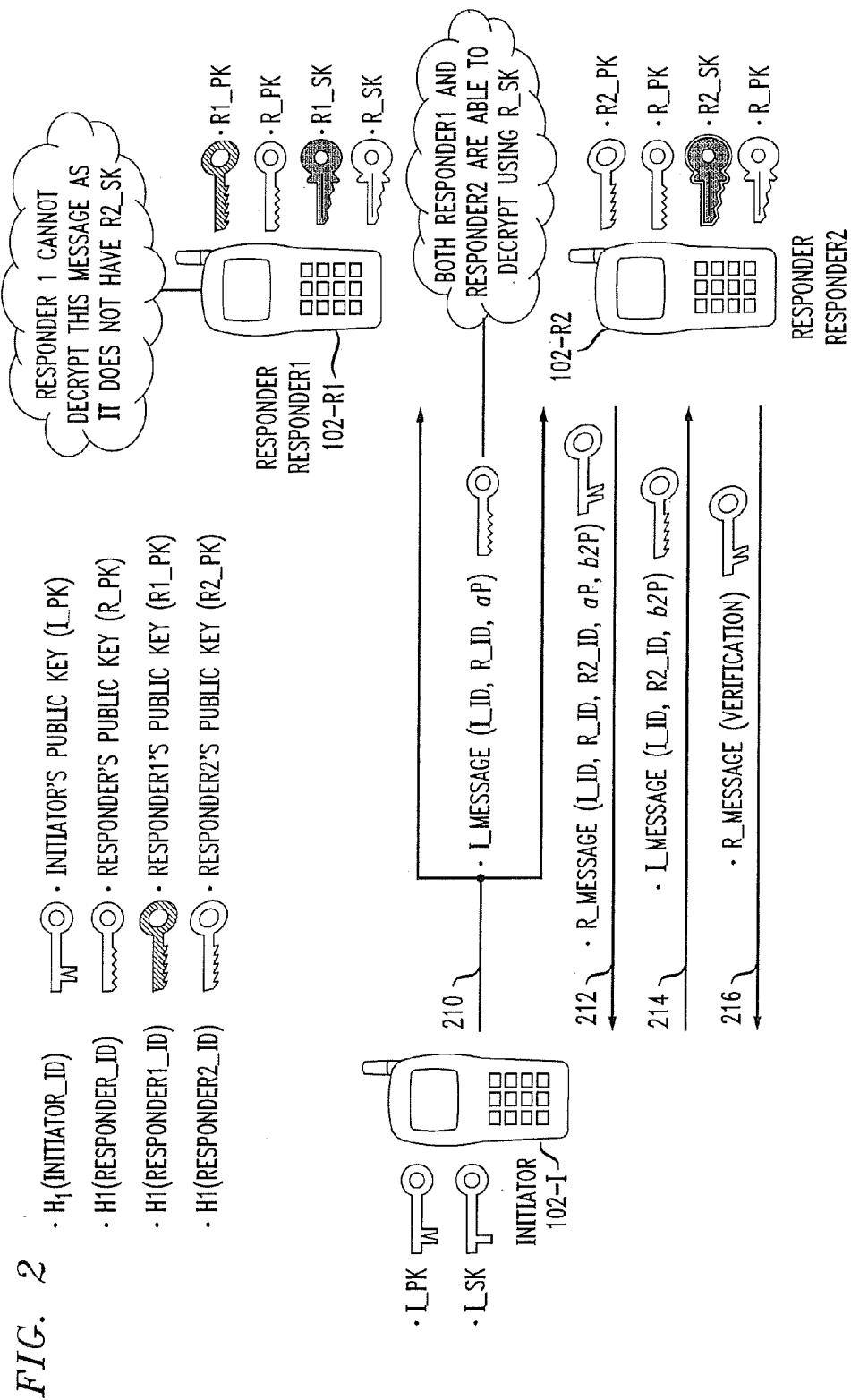

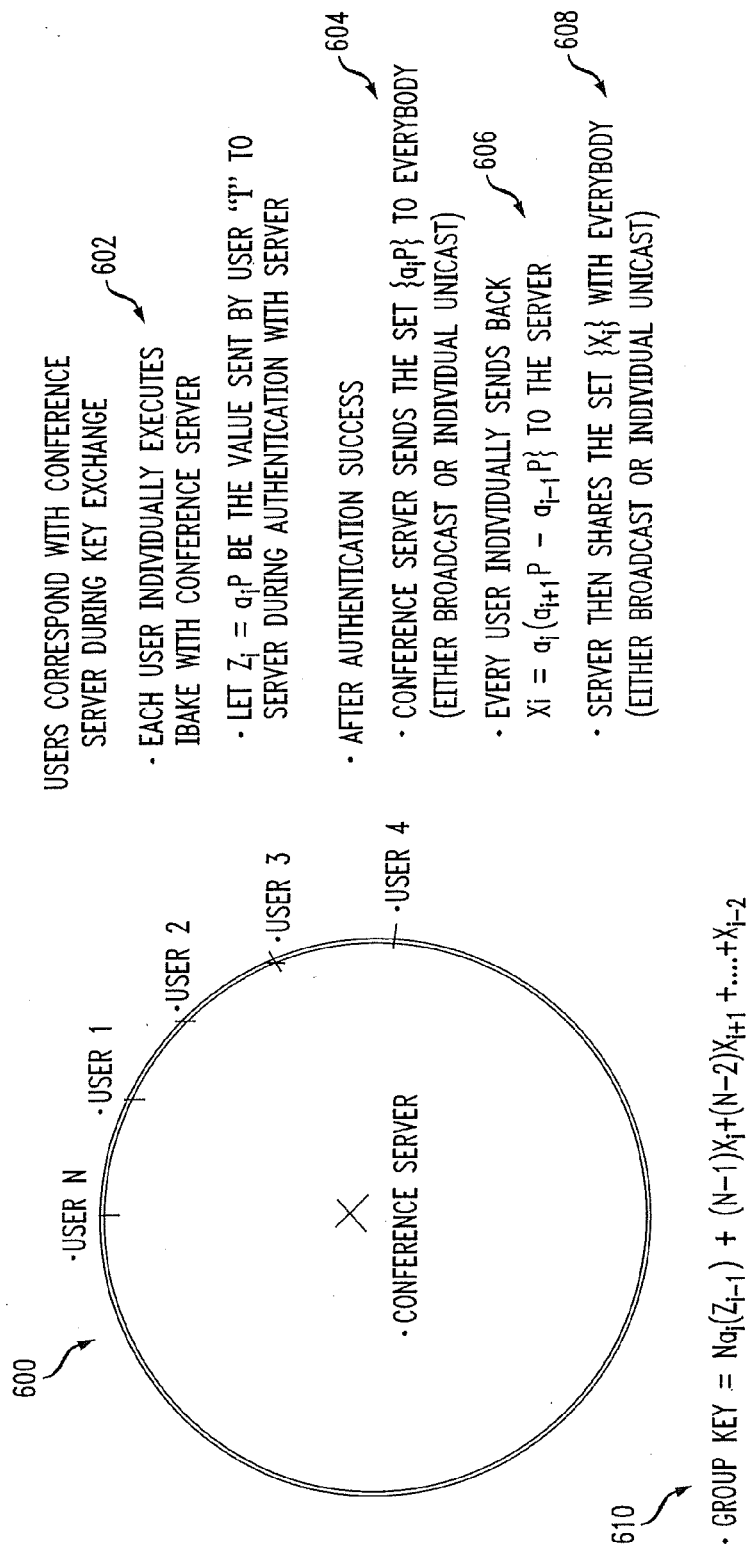

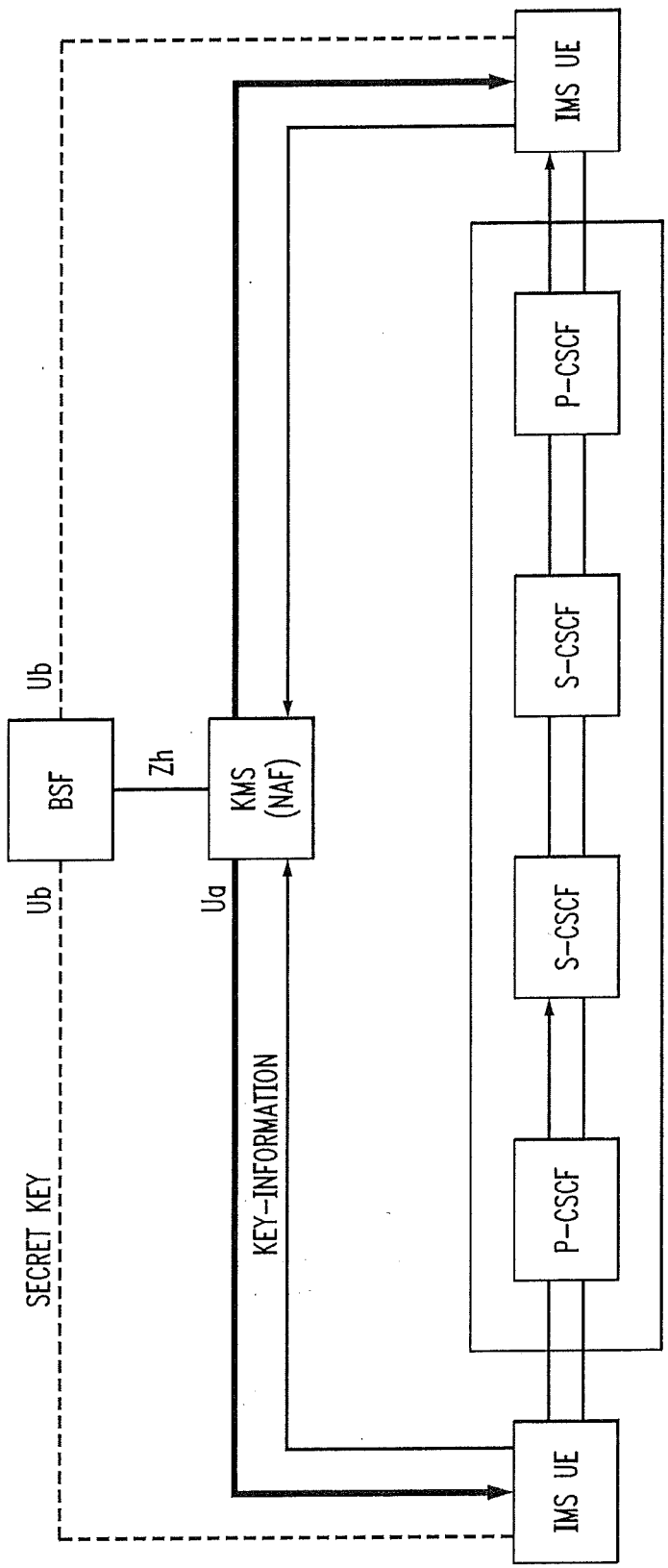

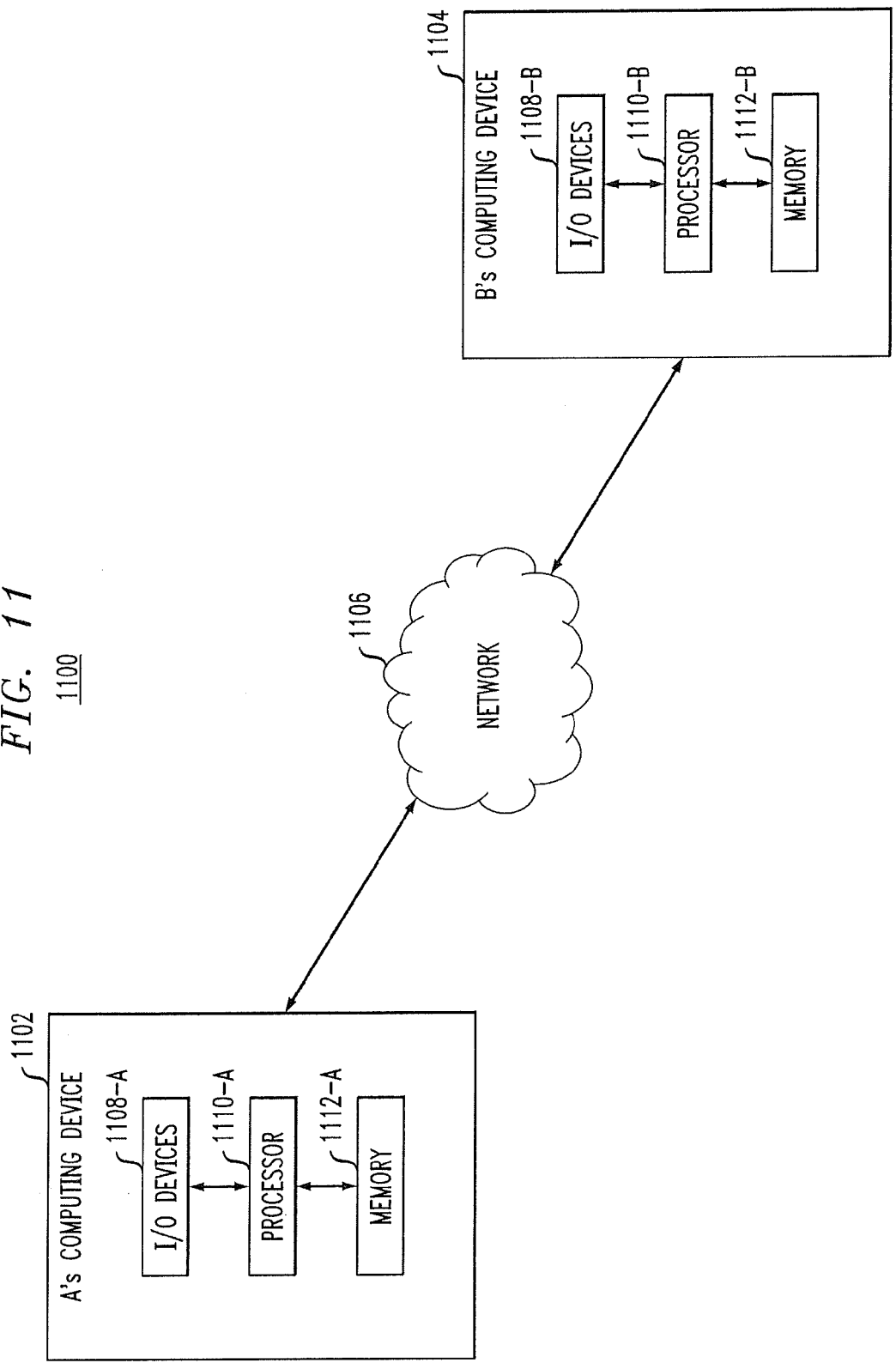

SECURE KEY MANAGEMENT IN CONFERENCING SYSTEM

CROSS REFERENCE TO RELATED APPLICATIONS

The present application is a continuation of U.S. patent application Ser. No. 12/549,907 (the "parent application") filed Aug. 28, 2009, the disclosure of which is hereby incorporated by reference herein. The parent application is related to commonly assigned U.S. patent application Ser. No. 12/549,932 entitled "Secure Key Management in Multimedia Communication System," the disclosure of which is incorporated by reference herein.

FIELD

The present application relates generally to communication security and, more particularly, to a secure key management protocol for use in communication environments such as a media plane of a multimedia communication system and a call conferencing system.

BACKGROUND

Existing multimedia applications offered in a multimedia communication system do not support security in the media plane. Concern over media plane security is a relatively new problem.

Existing proposals in a multimedia communication system such as the Internet Protocol (IP) Multimedia Subsystem (IMS) are based on some kind of token based symmetric key methods, managed using a key management server that potentially creates and distributes keys. 3GPP ($3^{rd}$ Generation Partnership Project) Technical Report (TR) 33.828, the disclosure of which is incorporated by reference herein, discusses existing proposals for IMS media plane encryption. However, these existing solutions are not scalable (since the server should be highly available and online all the time), do not provide authentication of entities, and, in addition, escrow keys at the server.

Conversely, non-IMS applications such as SKYPE (tradename of Skype Technologies S.A. of Luxembourg) and other client-to-client multimedia applications provide end-to-end privacy with authentication and no key-escrow. However, the solution relies on the use of certificates which require a highly available public key infrastructure (PKI) which is extremely expensive to manage. Moreover, the solution does not scale well for group conferencing applications, nor does it provide for lawful intercept of communications in the absence of a PKI.

Furthermore, similar key management security concerns exist in conferencing systems where parties participate in call sessions through a conference server.

Thus, a need exists for a secure key management solution for use in communication environments such as a media plane of a multimedia communication system and a call conferencing system.

SUMMARY

Embodiments of the invention provide one or more secure key management protocols for use in a communication environment such as a conferencing system.

For example, in one embodiment, a method for managing a conference between two or more parties in a communication system comprises the following steps. An identity based authenticated key exchange operation is performed between a conference management element of the communication system and each of the two or more parties seeking to participate in the conference, wherein messages exchanged between the conference management element and the two or more parties are encrypted based on respective identities of recipients of the messages, and further wherein the conference management element receives from each party during the key authentication operation a random key component that is computed based on a random number selected by the party.

The conference management element sends to each party a set comprising the random key components computed by the parties. The conference management element receives from each party a random group key component, wherein the random group key component is computed by each party via a computation based on the random number used by the party during the key authentication operation and the random key components computed by a subset of others of the two or more parties seeking to participate in the conference.

The conference management element sends to each party a set comprising the random group key components computed by the parties such that each party can compute the same group key for use in communicating with each other party through the conference management element.

In one embodiment, the conference management element is not a participating party in the conference and thereby is unable to compute the group key. In another embodiment, the conference management element is a participating party in the conference call and thereby is able to compute the group key.

In one embodiment, the group key computed by each party is represented as: $Na_i(Z_{i-1}) + (N-1)X_i + (N-2)X_{i+1} + \ldots + X_{i-2}$, where N represents the total number of parties seeking to participate in the conference, $a_i$ represents the random number selected by the given party, $Z_i$ represents the random key component computed by the given party, $X_i$ represents the random group key component computed by the given party, and i represents a number of a conference ordering for the given party in the N-party conference with i−1=N when i=1 and i+1=1 when i=N.

In one embodiment, the random key component for a given party is computed by a computation represented as: $a_i P$, where $a_i$ is the random number selected by the given party and P is a point selected from a group associated with the identity encryption-based key authentication operation.

In one embodiment, the random group key component for a given party is computed by a computation represented as: $a_i(a_{i+1}P - a_{i-1}P)$, where $a_i$ is the random number selected by the given party, $a_{i+1}P$ is the random key component sent to the conference management element by the party immediately following the given party in the conference ordering, $a_{i-1}P$ is the random key component sent to the conference management element by the party immediately preceding the given party in the conference ordering, and P is a point selected from a group associated with a cryptographic key exchange protocol.

It is to be appreciated that while principles of the invention are particularly suitable to an Internet Protocol (IP) Multimedia Subsystem (IMS) environment, the invention is not intended to be so limited. That is, principles of the invention are generally applicable to any suitable communication system in which it is desirable to provide secure key management features.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 1A illustrates a private key acquisition methodology according to an embodiment of the invention;

FIG. 2 illustrates a key forking methodology according to an embodiment of the invention;

FIG. 6A illustrates a conferencing management methodology according to an embodiment of the invention;

FIG. 7 illustrates network architecture for a secure key management protocol according to an IMS-based embodiment of the invention;

FIG. 11 illustrates a generalized hardware architecture of a data network and communication (computing) devices suitable for implementing one or more of the protocols according to embodiments of the present invention.

DETAILED DESCRIPTION

Figure 1B:
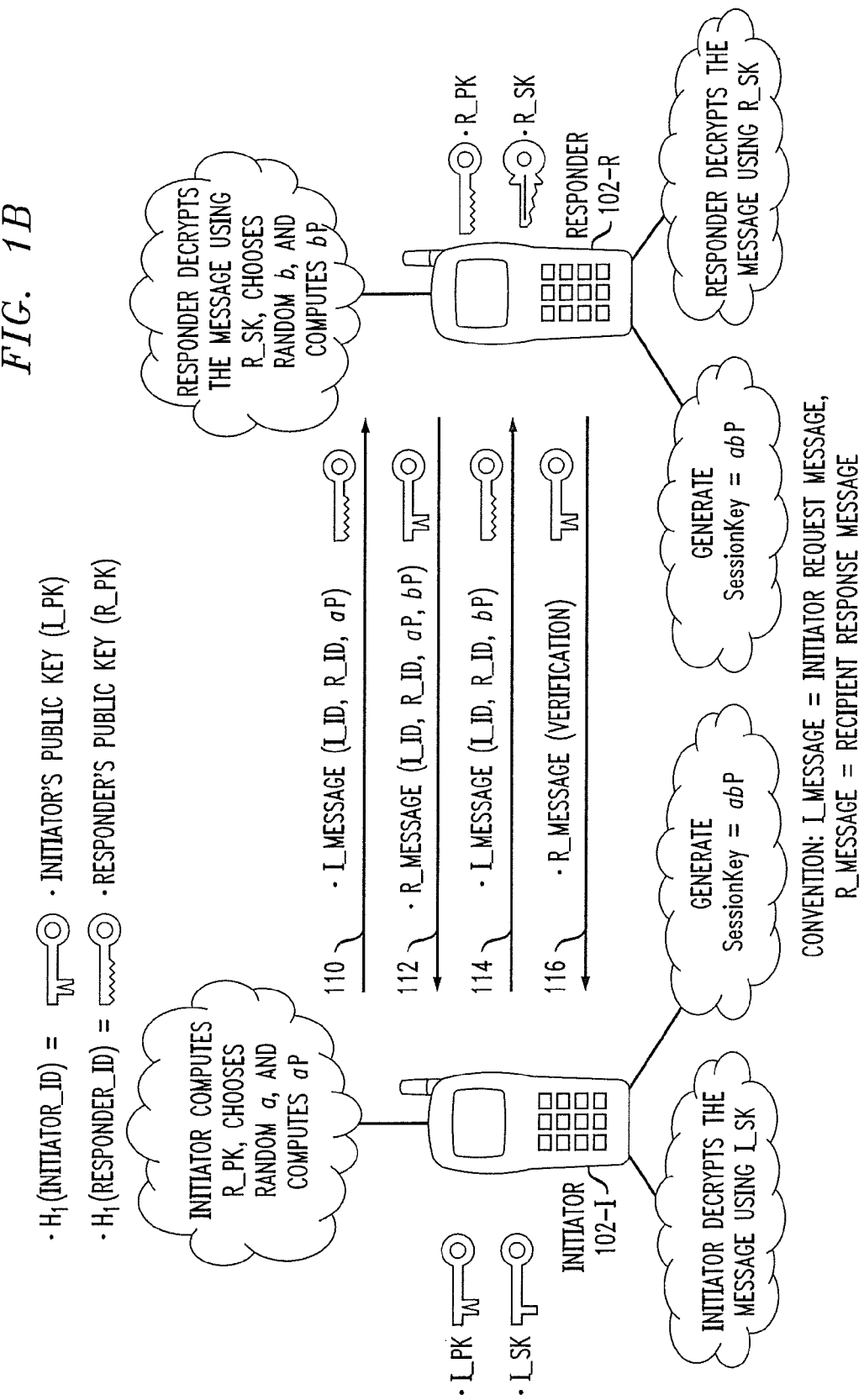
FIG. 1B illustrates an identity based authenticated key exchange methodology according to an embodiment of the invention.

The phrase "multimedia communication system" as used herein is generally defined as any communication system capable of transporting two of more types of media involving, but not limited to, text-based data, graphics-based data, voice-based data and video-based data.

The phrase "media plane" as used herein is generally defined as the functional portion of the multimedia communication system in accordance with which the one or more types of media are exchanged between two or more parties in a call session. This is in contrast with a "control plane" which is the functional portion of the multimedia communication system in accordance with which call negotiation/scheduling is performed in order to establish the call session. Examples of media plane applications with which the inventive techniques can be used include, but are not limited to, Voice-over-IP (VoIP), Instant Messaging (IM), Video/Audio IM, and Video Share. It is understood that the media plane contains application layer traffic.

The term "key" as used herein is generally defined as an input to a cryptographic protocol, for purposes such as, but not limited to, entity authentication, privacy, message integrity, etc.

For ease of reference, the detailed description is divided as follows. Section I describes general principles of identity based encryption and identity based authenticated key exchange operations. Section II describes secure key management solutions according to illustrative principles of the invention in a general communication environment context. Section III describes secure key management solutions according to illustrative principles of the invention in an Internet Protocol (IP) Multimedia Subsystem (IMS) environment context. Section IV describes an illustrative computing system for implementing one or more secure key management protocols according to the invention.

I. Identity Based Encryption (IBE) and Identity Based Authenticated Key Exchange (IBAKE)

Prior to an explanation of illustrative embodiments of secure key management techniques of the invention, general principles of IBE and IBAKE are provided.

A. Identity Based Encryption

An Identity Based Encryption (IBE) protocol was presented by Boneh and Franklin, see Dan Boneh, Matthew K. Franklin, "Identity-Based Encryption from the Weil Pairing" Advances in Cryptology—Proceedings of CRYPTO 2001 (2001), the disclosure of which is incorporated by reference herein. This asymmetric cryptographic encryption protocol allows participants to use an 'identity' (example: email-id, or domain name) as the public key and eliminates the need for large scale public key infrastructure which is often associated with public key encryption methods such as RSA (Rivest, Shamir and Adleman). Boneh and Franklin's approach to the problem uses bilinear maps on an elliptic curve over a finite field, and relies on the bilinear decisional Diffie-Hellman problem.

IBE involves the following mathematical tools and parameters:

Let E be an elliptic curve over a finite field F, and let P be a point of large prime order.

Let $e: E \times E \rightarrow G$ be a bi-linear map on E. The typical example is the Weil pairing, and hence G will be the group of n-th roots of unity where n is a function of the number of points on E over F.

Let s be a non-zero positive integer and be a secret stored in a Key Generation Function (KGF). This is a system-wide secret and not revealed outside the KGF.

Let $P_{pub}=sP$ be the public key of the system that is known to all participants. Recall sP denotes a point in E, since E is a group.

Let $H_1$ be a known hash function that takes a string and assigns it to a point on the elliptic curve, i.e., $H_1(A)=Q_A$ on E, where A is usually the identity, and is also the public key of A.

Let $d_A=sQ_A$ be the private key computed by the KGF and delivered only to A.

Let $H_2$ be a known hash function that takes an element of G and assigns it to a string.

Let m be a message that has to be encrypted and sent to A. The encryption function described by Boneh and Franklin is as follows:

Let $g_A=e(Q_A, P_{pub})$, and let r be a random number.

Encryption$_A(m)=(rP, m$ xor $H_2(g_A^r))$; in other words the encryption output of m has two coordinates u and v where $u=rP$ and $v=m$ xor $H_2(g_A^r)$. Note that "xor" refers to the exclusive OR logic function.

In order to decrypt (u,v), A recovers m using the following formula:

$$m=v \text{ xor } H_2(e(d_A,u)).$$

The proof of the formula is a straight forward exercise in bilinear maps, and the fact A has the secret $d_A$ (private key known only to A but not other participants). Also observe that the KGF, which computed $d_A$ in the first place, can also decrypt the message resulting in the KGF being a de-facto key escrow server.

B. Identity Based Authenticated Key Exchange

Identity Based Authenticated Key Exchange (IBAKE) is described in the U.S. patent application identified by Ser. No. 12/372,242, filed on Feb. 17, 2009, the disclosure of which is incorporated by reference herein. The IBAKE protocol allows devices to mutually authenticate each other, and derive a key that provides perfect forwards and backwards secrecy.

In the IBAKE embodiment described here, the basic set up for this protocol involves the mathematical constructs and parameters discussed above in subsection A. Recall that this protocol is asymmetric but does not require any PKI support; instead the protocol employs an offline server which serves as a Key Generation Function. The details of the protocol are outlined below:

Suppose A, B are the two entities (or parties, where A represents a computer system of a first party and B represents a computer system of a second party) that are attempting to authenticate and agree on a key.

We will use A and B to represent their corresponding identities, which by definition also represent their public keys.

Let $H_1(A)=Q_A$ and $H_1(B)=Q_B$ be the respective points on the elliptic curve corresponding to the public keys. In effect, one could refer to $Q_A$ and $Q_B$ as the public keys as well, since there is a one-to-one correspondence between the identities and the points on the curve obtained by applying $H_1$.

Let x be a random number chosen by A, and let y be a random number chosen by B.

The protocol exchanges between A and B comprises of the following steps:

A computes xP (i.e., P added to itself x times as a point on E, using the addition law on E) encrypts it using B's public key, and transmits it to B in a first step. In this step, encryption refers to identity based encryption described in subsection A above.

Upon receipt of the encrypted message, B decrypts the message and obtains xP. Subsequently B computes yP, and encrypts the pair {xP, yP} using A's public key and then transmits it to A in a second step.

Upon receipt of this message, A decrypts the message and obtains yP. Subsequently, A encrypts yP using B's public key and sends it back to B in a third step.

Following this, both A and B compute xyP as the session key.

Observe that A chose x randomly, and received yP in the second step of the protocol exchange. This allows A to compute xyP by adding yP to itself x times. Conversely, B chose y randomly, and received xP in the first step of the protocol exchange. This allows B to compute xyP by adding xP to itself y times. Note that any application of the protocol may utilize header data with the identities to ensure proper functioning of the protocol. This is relatively standard and applicable to almost any protocol exchange for key agreement.

Note also that x is random but xP provides no information about x. Therefore, xP is a component of a key based on a random secret chosen by A. Likewise, y is random but yP provides no information about y. Hence, yP is a component of a key based on a random secret known only to B.

Note further that xyP can serve as a session key. Also, the session key could be any known function of xyP. That is, the session key could equal f(xyP), where f is known to both parties and is not required to be secret (i.e., known to the world). One practical requirement on f should be that f is hard to compute without knowledge of x or y, and the output is of a satisfactory length from a cryptographic perspective, e.g., around 128 bits or more.

Some of the properties of the IBAKE protocol include:

Immunity from key escrow: Observe that all the steps in the protocol exchange are encrypted using IBE. So clearly the KGF can decrypt all the exchanges. However, the KGF can not compute the session key. This is because of the hardness of the elliptic curve Diffie-Hellman problem. In other words, given xP and yP, it is computationally hard to compute xyP.

Mutually Authenticated Key Agreement: Observe that all the steps in the protocol exchange are encrypted using IBE. In particular, only B can decrypt the contents of the message sent by A in the first and third steps, and similarly only A can decrypt the contents of the message sent by B in the second step. Moreover, at the end of the second step, A can verify B's authenticity since xP could have been sent in the second step only after decryption of the contents in the first step by B. Similarly, at the end of the third step, B can verify A's authenticity since yP could have been sent back in the third step only after correctly decrypting the contents of the second step and this is possible only by A. Finally, both A and B can agree on the same session key. In other words, the protocol is a mutually authenticated key agreement protocol based on IBE. While the above description provides the motivation for the security of the protocol, a cryptographic proof of security can be easily provided. The hardness of the protocol relies on the hardness of the Elliptic curve Diffie-Hellman problem, which is influenced by the choice of elliptic curve.

Perfect forward and backwards secrecy: Since x and y are random, xyP is always fresh and unrelated to any past or future sessions between A and B.

No passwords: the IBAKE protocol does not require any offline exchange of passwords or secret keys between A and B. In fact, the method is clearly applicable to any two parties communicating for the first time through any communication network. The only requirement is to ensure that both A and B are aware of each other's public keys, for example, through a directory service.

II. Secure Key Management and Illustrative Extensions

It has been realized that the Internet has rapidly evolved from a best effort data network into a multi-service IP (Internet Protocol) network with support for various classes of traffic including multimedia. This coupled with the rapid growth of mobile wireless networks, has created technology challenges. From the technology perspective, a central challenge that has been addressed reasonably well is the separation of call control functions, consisting of signaling to setup calls, from application layer traffic often referred to as the "media plane." Call control protocols such as H323 (see, e.g., International Telecommunications Union Standardization Section (ITU-T) Recommendation H.323, the disclosure of which is incorporated by reference herein), Session Initiation Protocol or SIP (see, e.g., Internet Engineering Task Force IETF RFC 3261, the disclosure of which is incorporated by reference herein), and IMS (see, e.g., 3GPP Technical Specifications TS 23.218, TS 23.228, TS 24.228, TS 24.229, and TS 24.930, the disclosures of which are incorporated by reference herein) have been standardized by various organizations such as IETF and 3GPP and are in various stages of adoption across fixed and mobile networks.

Simultaneously, elaborate mechanisms to secure signaling at various levels have been incorporated. However, in the media plane, while protocols such as Transport Layer Security or TLS (see, e.g., IETF RFC 2246, the disclosure is incorporated by reference herein), Secure Real-time Transport Protocol or SRTP (see, e.g., IETF RFC 3711, the disclosure is incorporated by reference herein), and Secure Multi-Purpose Internet Mail Extensions or SMIME (see, e.g., IETF RFC 2633, the disclosure is incorporated by reference herein) provide container formats for various applications, the security solutions in the media plane lack coherent and standardized methods to support end-to-end secure key management in the application layer.

Principles of the invention primarily address this issue. In particular, principles of the invention provide a scalable application and protocol agnostic secure key management framework for the media plane. In an illustrative framework, the inventive solutions utilize the asymmetric (hence public key) Identity Based Authenticated Key Exchange (IBAKE) protocol described above in section I.B. Illustrative embodiments describe key exchange mechanisms to support various features such as, for example, secure two party media plane communications, secure multi-party conferencing, secure call forking, secure call re-direct, and secure deferred delivery applications. In addition to providing a scalable framework for secure key management, some exemplary aspects of the design and framework include:

The use of offline key management servers (KMS) that dramatically reduce the complexity of network support required. Recall that asymmetric protocols in a public key setting require elaborate always on Public Key Infrastructure (PKI) support for certificate management including revocation. Symmetric key based Key Management Servers are by definition "always on" servers, with constant synching and updates. By eliminating the "always on" requirement, our framework dramatically reduces costs and abets scalability.

The elimination of any passive key escrow that is inherent in identity based protocols. Recall that symmetric key protocols with a Key Management Server can not eliminate this problem. Also, recall that existing Identity Based Encryption (described above in section I.A.) protocols suffer from key escrow problems; a problem that is solved using IBAKE (described above in section I.B.).

The protocol framework inherently supports mutual authentication of entities involved in the key exchange, coupled with perfect secrecy.

Illustrative embodiments of the invention re-use existing network element architectures, and as much as possible, re-use existing protocol container formats. As an example, in conferencing applications, illustrative embodiments re-use the conference server to enable conferencing but ensure that the conference server does not learn the group key used for communication (unless it is also a party to the conference as will be explained below).

While principles of the invention eliminate passive key escrow, the inventive protocols also provide seamless support for discovering keys when there is a legal requirement for law enforcement to intercept calls.

In illustrative embodiments based on an identity based asymmetric cryptographic framework, each participant has a public key and a private key. The public key is identity based. The private key corresponds to the public key and is issued by a key management server or service (KMS). Participants can obtain private keys from the KMS offline. By way of example only, participants contact their KMS once a month (more generally, for the length of a subscription) to obtain private keys. Private keys may also be obtained as a function of frequency of use. A security association is assumed to exist between the KMS and the participant. Encryption and decryption of messages during the key exchange are based on IBE. Note that public parameters of the KMS are assumed to be publicly available (e.g., online on a website).

In general, a secure key management methodology according to an illustrative embodiment of the invention comprises two main stages. In a first stage, participants (parties) obtain private keys from a key service such as a KMS. In the second stage, an identity based authenticated key exchange is performed between two or more parties seeking to communicate in a multimedia based call session. Messages exchanged between the two or more parties are encrypted based on respective identities of recipients of the messages. Also, the encrypted messages exchanged between the parties contain identities associated with parties.

FIG. 1A shows the first stage of the secure key management methodology, i.e., private key acquisition. As shown, communication devices (more generally, computing devices) 102 of two parties each request and obtain private (or secret) keys from a respective KMS 104. The private key exchange 106 is performed according to a secure communication protocol. Examples of secure communications protocol include, but are not limited to, Internet Protocol Security or IPSec (see, e.g., IETF RFC 2406, IETF RFC 2409, IETF RFC 4306, and IETF RFC 4308, the disclosures of which are incorporated by reference herein) and Transport Layer Security or TLS (see, e.g., IETF RFC 2246, the disclosure is incorporated by reference herein). Generalized Bootstrap Architecture or GBA (see, e.g., 3GPP Technical Specification (TS) 33.220, the disclosure of which is incorporated by reference herein) may be used to determine a key to use in the secure communications protocol between each party and the KMS. In one example, one could have an application running in the client device that connects to the KMS server and uses TLS in the application layer (above Transport Control Protocol or TCP, see, e.g., W. Richard Stevens. TCP/IP Illustrated, Volume 1: The Protocols, ISBN 0-201-63346-9; W. Richard Stevens and Gary R. Wright. TCP/IP Illustrated, Volume 2: The Implementation, ISBN 0-201-63354-X; W. Richard Stevens. TCP/IP Illustrated, Volume 3: TCP for Transactions, HTTP, NNTP, and the UNIX Domain Protocols, ISBN 0-201-63495-3, the disclosures of which are incorporated by reference herein) which uses the GBA key or IPSec at the network layer with the GBA key as the pre-shared key.

Note that the device on the left is considered the initiator (I) and the one on the right is the responder (R). This designation comes from the fact that the device on the left seeks to initiate a multimedia call session with the device on the right.

As shown, each device provides an identifier with its request to the KMS to which the KMS responds with a private (secret) key. In the case of the initiator device 102-I, one identifier is provided to the KMS 104-I, and one private key I-SK is provided to the device in response. In the case of the responder device 102-R, two separate identifiers are sent to the KMS 104-R, i.e., R and R1. In response, the KMS provides the responding party with two private keys R_SK and R1_SK. Of course, each party may request and obtain more or less private keys based on some private key acquisition schedule. This may be a time-based schedule (e.g., one month period), a call session frequency-based schedule (e.g., when needed to make a call), and a subscription-based schedule (e.g., the party subscribes to the key service of the KMS for some length of time or based on an occurrence of a subscription ending condition).

Also, it is to be appreciated that a given party may have multiple public identities. For example, party B ("Bob") may have two identities: bob@work.com and bob@home.com.

For these two identities, there can be two different public keys and thus two different private keys.

FIG. 1B shows the second stage of the secure key management methodology, i.e., authenticated key exchange. In this embodiment, the authenticated key exchange is based on IBAKE (described above in section I.B.). Since a preferred format of the messages exchange between the first party and the second party is based on a Multimedia Internet Keying (MIKEY) format, the overall secure key exchange protocol of FIGS. 1A and 1B is therefore referred to herein as a MIKEY-IBAKE protocol.

Again, it is assumed that the device on the left is the initiating party or initiator, 102-I, and the device on the right is the responding party or responder, 102-R. The steps of the authenticated key exchange follow steps similar to the IBAKE protocol.

It is assumed that the initiator's public key I_PK is computed by using a hash function as described above in section I. Likewise, the responder's public key R_PK is computed in a similar manner. Recall that the private keys of the initiator and responder are I_SK and R_SK, respectively. That is, let $H_1$ (Initiator_ID)=I_PK and $H_1$(Responder_ID)=R_PK be the respective points on the elliptic curve corresponding to the public keys.

Let a be a random number chosen by initiator 102-I, and let b be a random number chosen by responder 102-R.

The protocol exchanges between 102-I and 102-R comprise of the following steps:

Initiator 102-I computes a first random key component aP (i.e., P added to itself a times as a point on E, using the addition law on E), encrypts the first random key component using the responder's public key (R_PK), and transmits it to the responder 102-R in step 110. In this step, encryption refers to identity based encryption described in subsection I.A. above. Note that also included in the encrypted message in step 110 are the identities of the initiator and the responder (I_ID and R_ID, respectively).

Upon receipt of the encrypted message, the responder decrypts the message using its private key (obtained in FIG. 1A) and obtains aP. Subsequently, the responder computes a second random key component bP, and encrypts the pair {aP, bP} using the initiator's public key and then transmits the pair to the initiator in step 112. Again, the encrypted message in step 112 includes the identities of the initiator and the responder (I_D and R_ID, respectively).

Upon receipt of the message from step 112, the initiator decrypts the message using its private key (obtained in FIG. 1A) and obtains bP. Subsequently, the initiator encrypts bP using the responder's public key and sends it back to the responder in step 114. Again, the encrypted message in step 114 includes the identities of the initiator and the responder (I_ID and R_ID, respectively).

In step 116, the responder sends a verification message to the initiator encrypted using the public key of the initiator.

Following this, both initiator and responder compute abP as the secure call session key to be used for secure communicating with each other during the call session via the media plane (application layer) of the multimedia communication system.

Observe that the initiator 102-I chose a randomly, and received bP in the second step of the protocol exchange. This allows the initiator to compute abP by adding bP to itself a times. Conversely, the responder 102-R chose b randomly, and received aP in the first step of the protocol exchange. This allows the responder to compute abP by adding aP to itself b times. Note also that a is random but aP provides no information about a. Therefore, aP is considered a component of a key based on a random secret chosen by the initiator. Likewise, b is random but bP provides no information about b. Hence, bP is considered a component of a key based on a random secret known only to the responder.

Referring now to FIG. 2, an extension of the MIKEY-IBAKE protocol is illustrated. It is to be understood that since this is an extension of the MIKEY-IBAKE protocol described above, for the sake of simplicity, not all features of the MIKEY_IBAKE protocol are repeated. In this particular embodiment, FIG. 2 illustrates forking. Forking is the delivery of a request to multiple locations. This may happen, for example, when the responder has more than one communication (computing) device on which he/she can participate in a multimedia call session. One example of forking is when a party has a desk phone, a personal computer (PC) client, and mobile handset, all configured to participate in the MIKEY-IBAKE protocol. In general, forking is a feature of a multimedia session initiation protocol than enables an incoming call to simultaneously ring several extensions. The first telephone to answer will then take control of the call.

Thus, as depicted in FIG. 2, the responding party has two devices 102-R1 and 102-R2 associated therewith. Thus, as shown, device 102-R1 has a public key R1_PK and a secret key R1_SK. Also, device 102-R1 knows the responding party's public and private keys, R_PK and R_SK. Likewise, device 102-R2 has a public key R2 PK and a secret key R2_SK. Also, device 102-R2 knows the responding party's public and private keys, R_PK and R_SK.

The MIKEY-IBAKE protocol steps 210, 212, 214 and 216 in the forking scenario are essentially the same as the MIKEY-IBAKE protocol steps 110, 112, 114 and 116 in the general context of FIG. 1B, with the following exceptions. Note that because the message sent by device 102-I in step 210 is encrypted with R_PK, both devices R1 and R2 can decrypt the message (since they both have R_SK). However, assuming that the responding party is currently associated with device R2 rather than device R1, then the return message in step 212 includes random key component b2P, computed by R2 in accordance with IBAKE (where b2 is the random number selected by R2). Also, the encrypted messages in step 212 includes the identities of the initiator, responder, and device R2 (I_ID, R_ID and R2_ID, respectively).

Device 102-I decrypts the message received from R2 using its private key to obtain the b2P and the identities included in the message. The initiator thus identifies that the message in step 212 came from R2. In accordance with the MIKEY-IBAKE protocol, the initiator then sends a message in step 214 including b2P, I_ID, and R2_ID. The message is encrypted using the public key of R2. Note that this can not be decrypted by R1 since R1 only has R_SK and R1_SK, but not R2_SK. Step 216 is the verification message similar to step 116 in FIG. 1B. The call session key can then be computed at device 102-I and at device 102-R2 as ab2P.

Figure 3:
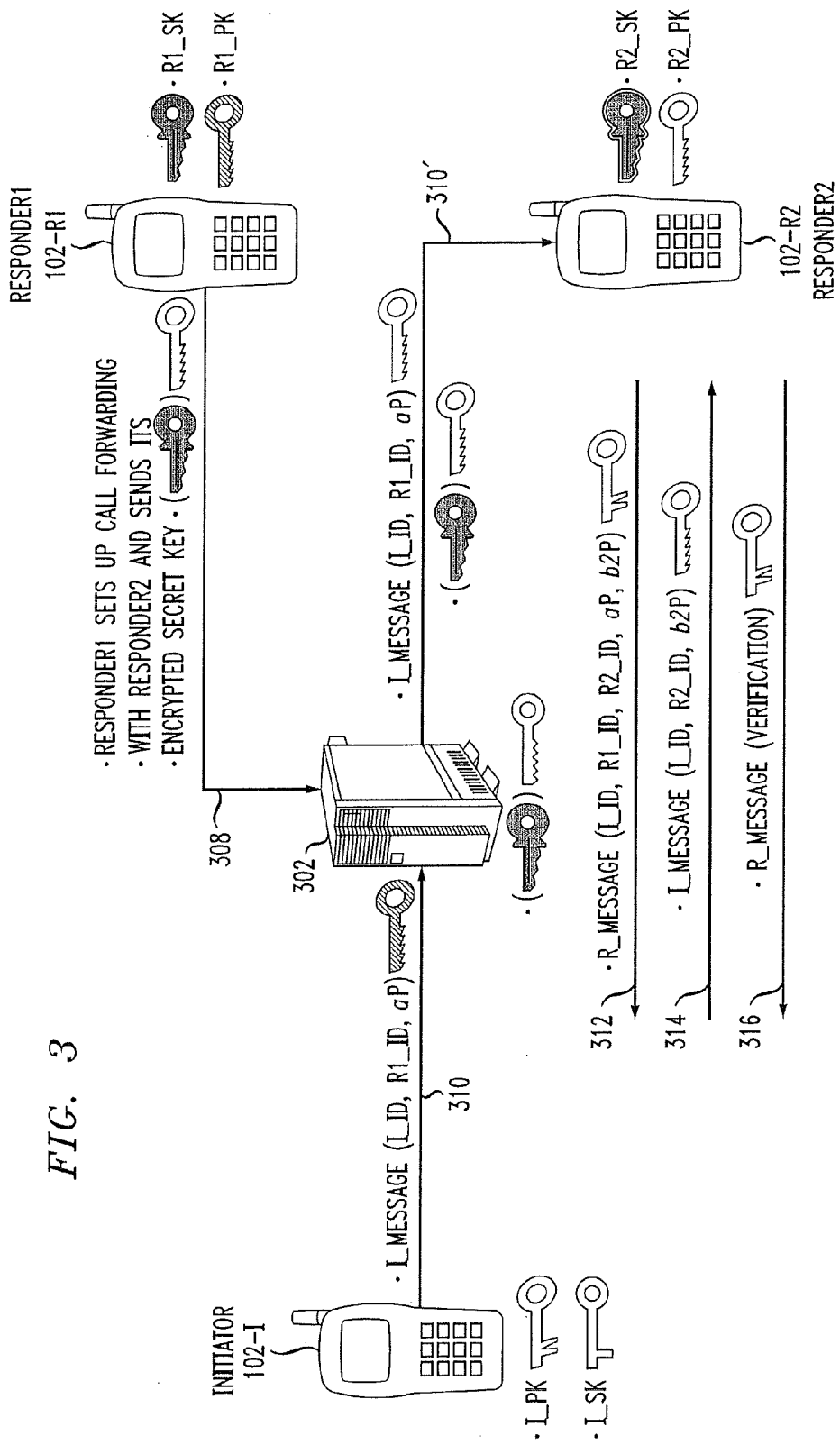
FIG. 3 illustrates a call redirection methodology according to an embodiment of the invention.

FIG. 3 illustrates an extension of the MIKEY-IBAKE protocol to a retargeting feature. It is to be understood that since this is an extension of the MIKEY-IBAKE protocol described above, for the sake of simplicity, not all features of the MIKEY_BAKE protocol are repeated. Retargeting or redirection is a scenario in which one or more functional elements in the communication system decide to redirect the call to a different destination. This decision to redirect a session may be made for different reasons by a number of different functional elements, and at different points in the establishment of the session. This is also known as call forwarding.

The example of FIG. 3 shows an application server 302 making the redirect determination. The MIKEY-IBAKE protocol steps 310, 312, 314 and 316 in the forking scenario are essentially the same as the MIKEY-IBAKE protocol steps 110, 112, 114 and 116 in the general context of FIG. 1B, with the following exceptions.

Device 102-I sends the first message in the protocol in step 310 with the intention of it going to device 102-R1 (the message encrypted with R1's public key). However, the functional element 302 made a decision that the message in 310 should be redirected to device R2, see step 310'. Prior thereto, or in conjunction therewith, it is assumed that R2 received R1's private key in a message sent in step 308 via the functional element. The message sent from R1 to R2 is encrypted using R2's public key. Thus, functional element 302 can not decrypt the message in 308 but R2 can decrypt the message in 310' and respond to the initiator in step 312. From this point, steps 312, 314 and 316 are identical to steps 212, 214 and 216 in the forking scenario of FIG. 2.

Figure 4A:
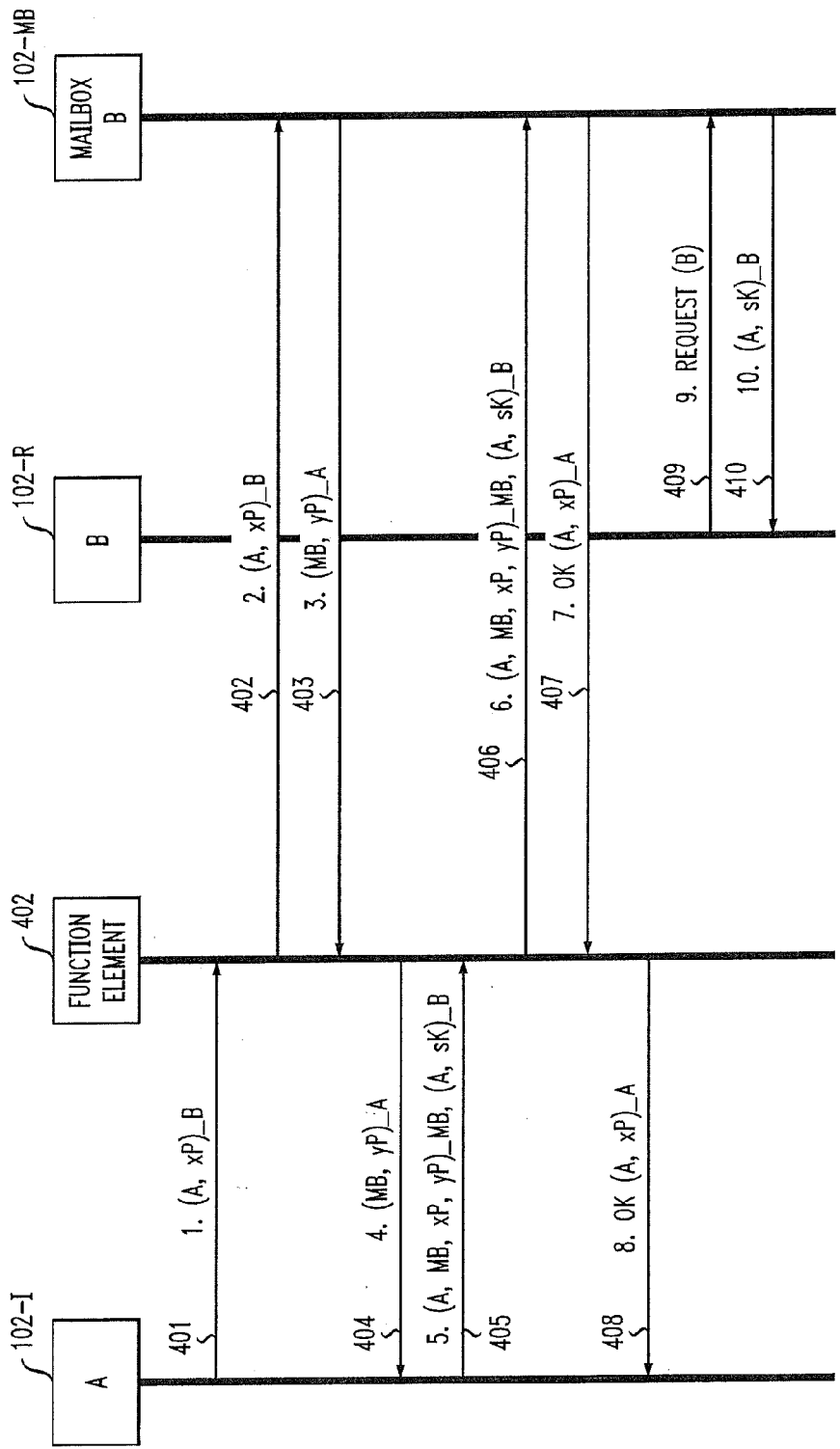
FIG. 4A illustrates a deferred delivery methodology according to an embodiment of the invention.

FIG. 4A shows a deferred delivery extension of the MIKEY-IBAKE protocol. It is to be understood that since this is an extension of the MIKEY-IBAKE protocol described above, for the sake of simplicity, not all features of the MIKEY_MAKE protocol are repeated. Deferred delivery is type of service such that the session content can not be delivered to the destination at the time that it is being sent (e.g., the destination user is not currently online). Nevertheless, the sender expects the network to deliver the message as soon as the recipient becomes available. One example of deferred delivery is voicemail.

In FIG. 4A, assume A is device 102-I, B is 102-R, device 402 is a functional element such as an application server, and MB is a mailbox 102-MB (more generally, a temporary destination) associated with B.

In step 401, A sends a first message comprising an encrypted first random key component (xP) to B. The first random key component was computed at A, and the first message was encrypted using a public key of B. The functional element 402 determines that B is unavailable, and forwards the first message to MB in step 402.

In step 403, MB sends to A a second message comprising an encrypted second random key component (yP) which was computed by MB. The message in step 403 was encrypted at MB using a public key of A. In step 404, functional element 402 sends the message on to A.

A decrypts the message from MB using the private key obtained by A from the key service to obtain the second random key component. A identifies that the message received in step 404 came from MB (due to MB's identity being included in the message).

In step 405, A sends a third message (via the functional element in step 406) to MB including an encrypted random key component pair, the random key component pair having been formed from the first random key component (xP) and a second random key component (yP) and encrypted at A using the public key of MB. This third message also includes an encrypted random secret key (sK) computed at A and encrypted at A using the public key of B. MB acknowledges receipt to A via steps 407 and 408. MB can not decrypt that latter part of the message (since it is encrypted using B's public key and MB does not have B's private key), and thus can not learn sK.

MB provides the encrypted random secret key (sK) to B upon request by B, after a mutual authentication operation between B and MB. This is shown in steps 409 and 410. This secret key is then used by B to obtain the content (e.g., voice message) left by A in B's mailbox.

Figure 4B:
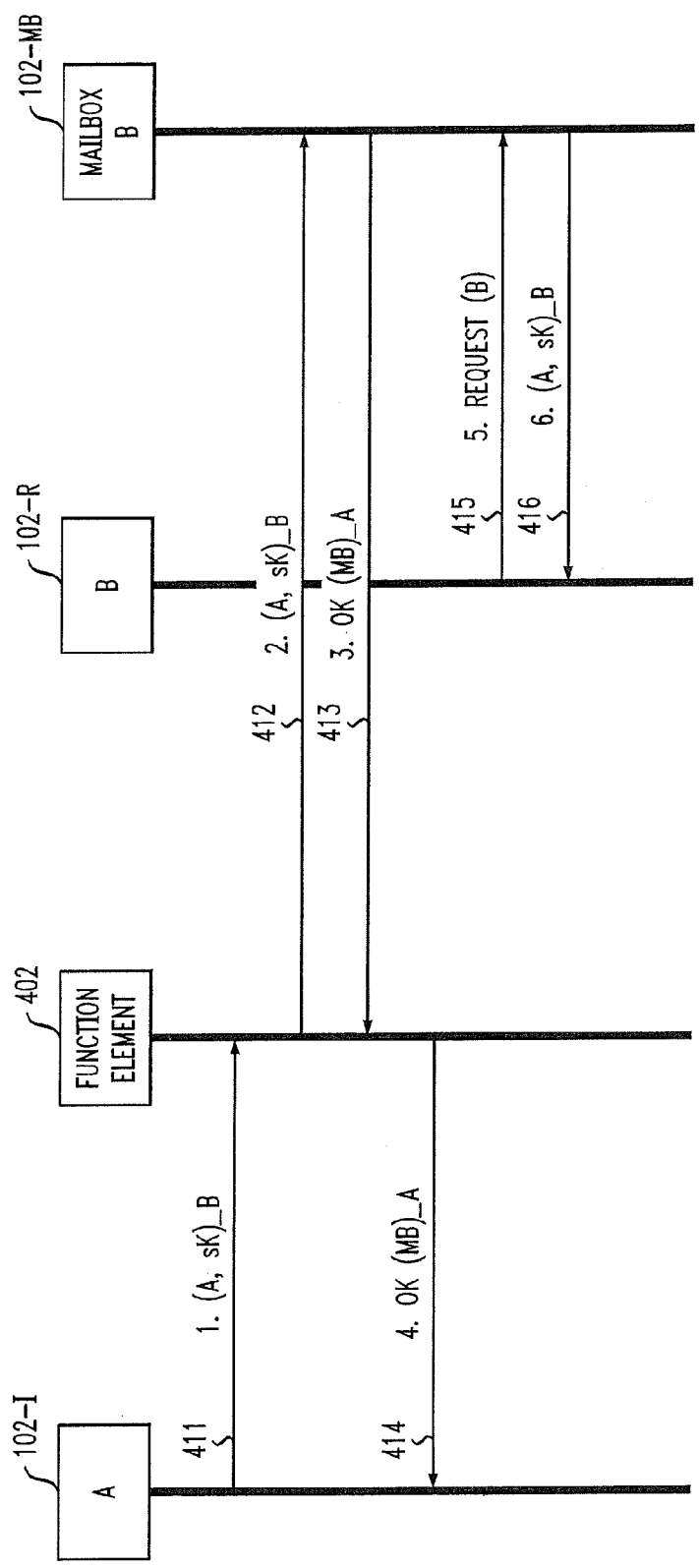
FIG. 4B illustrates a deferred delivery methodology according to another embodiment of the invention.

In a variation to the deferred delivery of FIG. 4A, depicted in FIG. 4B, assume that an authenticated key agreement protocol is not performed but rather, in the first message, A sends an encrypted random secret key (sK) computed at A and encrypted at A using a public key of B (step 411). The functional element 402, having determined that B is unavailable, forwards the first message to MB (step 412), which confirms it (steps 413 and 414). Later, B can retrieve the secret key from MB in the same manner as described above (steps 415 and 416).

Figure 5:
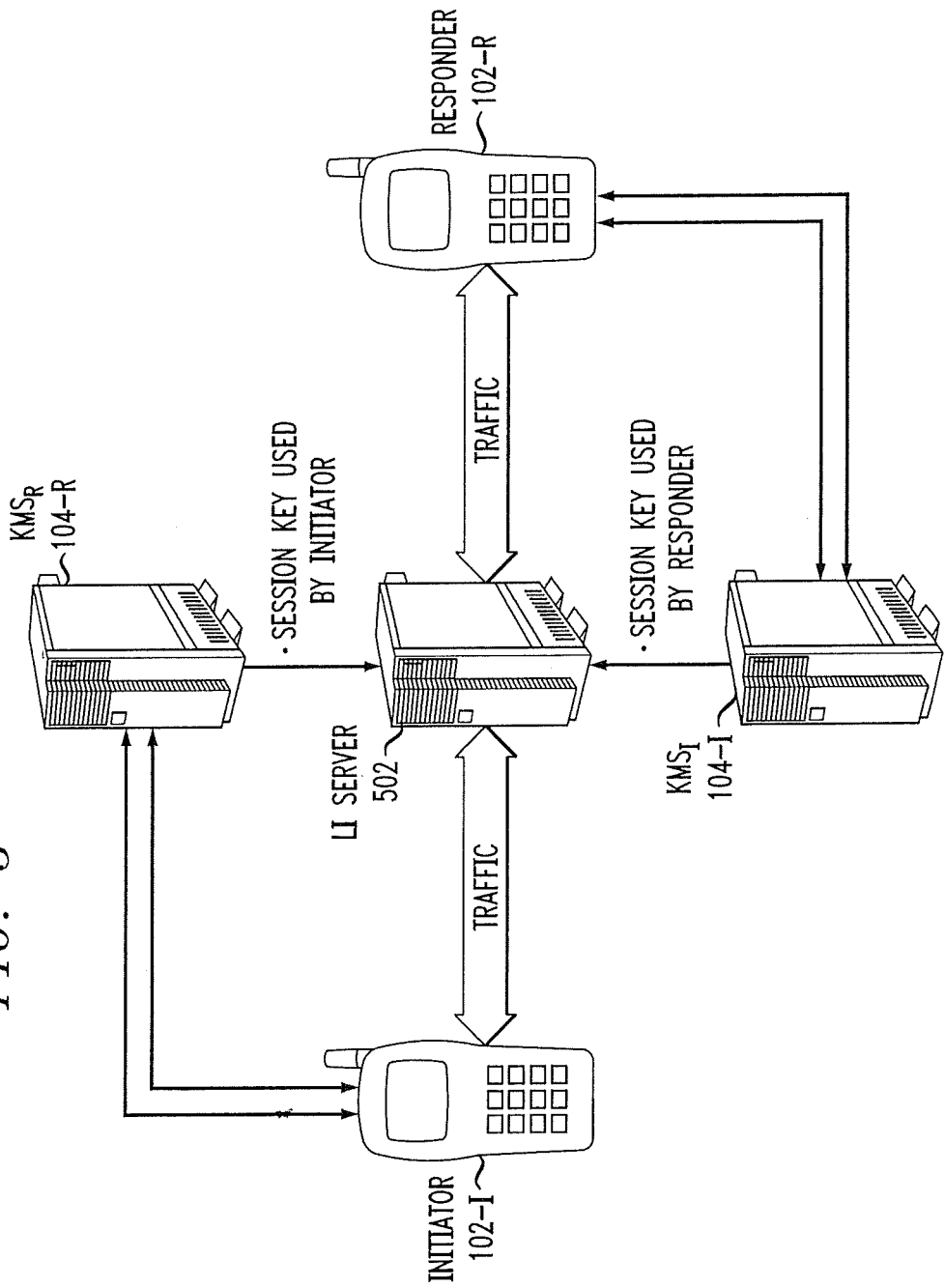
FIG. 5 illustrates a lawful intercept methodology according to an embodiment of the invention.

FIG. 5 shows yet another extension of the MIKEY-IBAKE protocol. Again, it is to be understood that since this is an extension of the MIKEY-IBAKE protocol described above, for the sake of simplicity, not all features of the MIKEY_IBAKE protocol are repeated. The extension in FIG. 5 relates to the concept of lawful interception of messages exchanged in the multimedia communication system. The concept of lawful intercept is based on a situation when a law enforcement authority needs to be able to "listen in" on communications of one or more parties.

In one approach, the law enforcement authority can simply obtain the private keys of 102-I and 102-R through a search warrant, and play active "man-in-the-middle" during the key agreement protocol and then tap into the traffic.

In another approach, shown in FIG. 5, a law enforcement server (LI server) 502 functions with the initiator's KMS ($KMS_I$) and the responder's KMS ($KMS_R$) to lawfully intercept messages sent between device 102-I and device 102-R. While FIG. 5 shows separate servers for the LI server, $KMS_I$, and $KMS_R$, it is to be appreciated that one functional element (e.g., an intercept server) in the multimedia communication system may be used to perform KMS and intercept functions.

Accordingly, the MIKEY_MAKE protocol as described above in the context of FIGS. 1A and 1B is performed. However, the LI server imitates the initiator for messages sent to the responder, and imitates the responder for messages sent to the initiator.

For example, consider the message flow when the LI server imitates the responder. Assume 102-I sends a first message including an encrypted first random key component for intended receipt by 102-R. The first message is intercepted by the LI server. The LI server then computes a second random key component and sends a second message including an encrypted random key component pair to 102-I. The random key component pair is formed from the first random key component and the second random key component computed at the LI server. The second message is encrypted at the LI server using the public key of 102-I.

The second message is decrypted using the private key obtained by 102-I from the key service to obtain the second random key component. Device 102-I then sends a third message including the second random key component for intended receipt by 102-R, but which is intercepted by the LI server. Thus, the LI server is able to compute the same secure key that device 102-I computes.

It is to be understood that the LI server also imitates the initiator (102-I) in sending and receiving messages during the authenticated key agreement operation such that the responder (102-R) establishes a secure key with the LI server that the responder believes was agreed upon by the initiator (but, in fact, was agreed upon with the LI server).

Figure 6B:
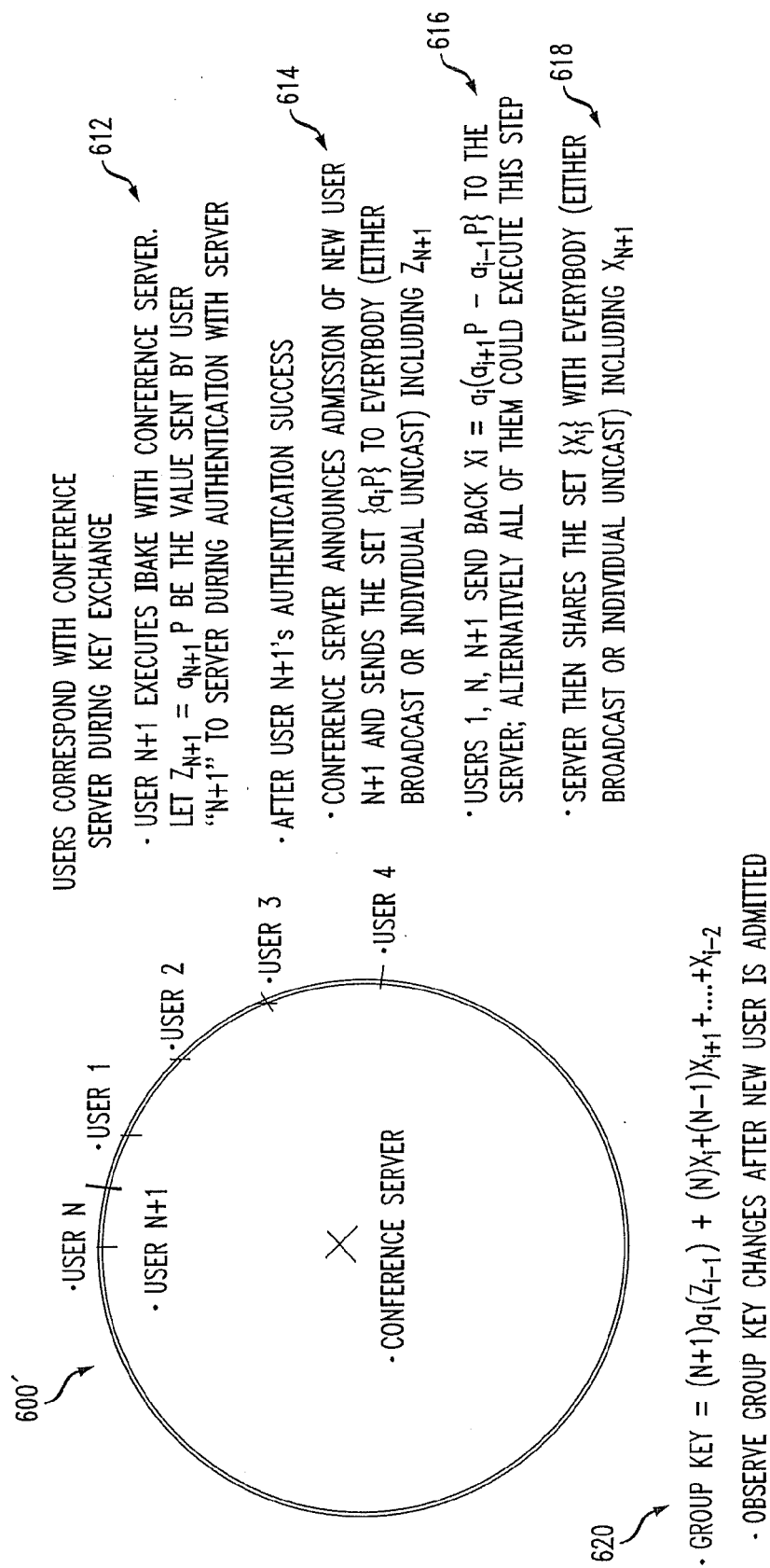
FIG. 6B illustrates addition of a participant in a conferencing management methodology according to an embodiment of the invention.
Figure 6C:
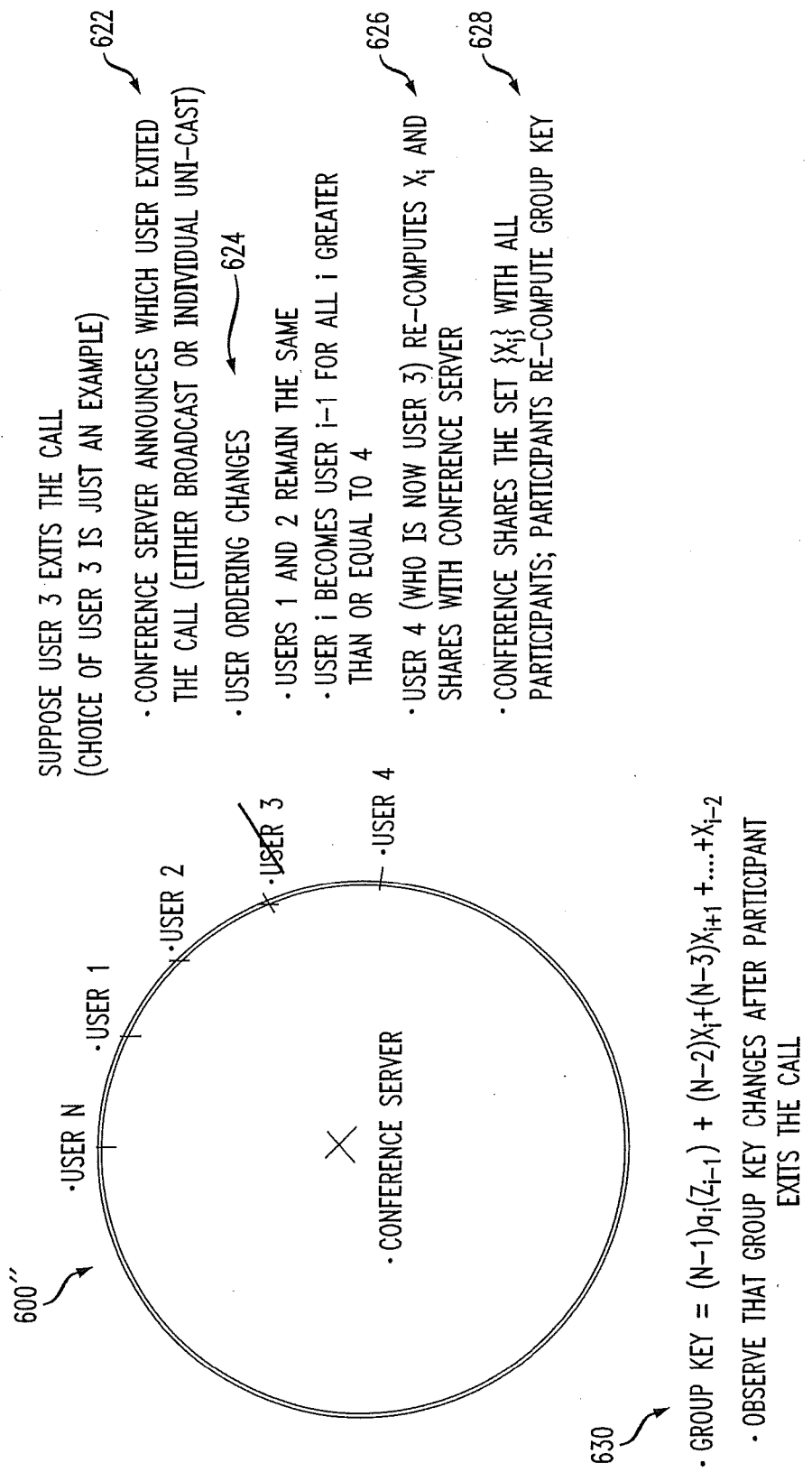
FIG. 6C illustrates deletion of a participant in a conferencing management methodology according to an embodiment of the invention.

It is to be appreciated that one or more of the MIKEY-IBAKE protocol features described above can be extended to a conferencing system scenario. Such an extension is depicted in FIGS. 6A through 6C.

The general assumption is that the conference server (more generally, the conference management element) relaying multiparty communication (e.g., a conference bridge) does not know the group key, while all the users have access to the same group key. There is an exception to this assumption, i.e., in peer-to-peer conferencing, when the computing device serving as the conference bridge is also a party substantively participating in the conference.

As shown in FIG. 6A, a multiparty conference 600 is assumed including a conference server and users (parties) 1 through N, where the user number is assigned in the order that the user seeks to join the conference, i.e., sequentially 1, 2, 3, . . . N.

In step 602, each user individually executes the IBAKE protocol with the conference server. Let $Z_i=a_iP$ be the value sent by user "I" to the conference server during authentication with server. Recall that $a_iP$ is the random key component computed by the party in accordance with IBAKE.

After authentication success, in step 604, the conference server sends the set $\{a_iP\}$ to every user (either broadcast or individual unicast). Set $\{a_iP\}$ is thus a set which includes the random key components computed by each of the parties.

In step 606, every user individually sends back $Xi=a_i\{a_{i+1}P-a_{i-1}P\}$ to the conference server. Note that $a_i\{a_{i+1}P-a_{i-1}P\}$ is a random group key component, wherein the random group key component is computed by each party via a computation based on the random number used by the party during the key authentication operation and the random key components computed by a subset of others of the two or more parties seeking to participate in the conference. In this embodiment, the random group key component for a given party $a_i\{a_{i+1}P-a_{i-1}P\}$ is computed such that $a_i$ is the random number selected by the given party, $a_{i+1}P$ is the random key component sent to the server by the party immediately following the given party in the conference ordering, $a_{i-1}P$ is the random key component sent by the party immediately preceding the given party in the conference ordering, and P is a point selected from a group associated with the identity encryption-based key authentication operation (e.g., point selected from an elliptic curve as described above).

In step 608, the conference server then shares the set $\{X_i\}$ with everybody (either broadcast or individual unicast). That is, set $\{X_i\}$ is a set including the random group key components computed by the parties.

In step 610, each party can compute the same group key for use in communicating with each other party through the conference server. The group key is computed as follows $Na_i(Z_{i-1})+(N-1)X_i+(N-2)X_{i+1}+\ldots+X_{i-2}$, where N represents the total number of parties seeking to participate in the conference, $a_i$ represents the random number selected by the given party, $Z_i$ represents the random key component computed by the given party, $X_i$ represents the random group key component computed by the given party, and i represents a number of a conference ordering for the given party in the N-party conference with i−1=N when i=1 and i+1=1 when i=N.

As mentioned above, the conference server is not a participating party in the conference and thereby is unable to compute the group key. However, in a peer-to-peer scenario, the conference server is a participating party in the conference call and thereby needs to be able to compute the group key.

It is understood that the conference server performs a mutual authentication operation with each party seeking to participate in the conference. The conference server also only admits a given party to the conference when at least two conditions are met: (i) the given party is authenticated by the conference management element; and (ii) the given party is confirmed to belong to a conference authorization list. Also, in accordance with the above MIKEY-IBAKE protocol, the parties seeking to participate in the conference, and the conference server, obtain respective private keys from one or more key management services (KMS).

FIG. 6B illustrates how a new conference participant (user N+1) is added to an ongoing conference, thus resulting in modified conference 600'.

In step 612, user N+1 executes IBAKE with the conference server. Let $Z_{N+1}=a_{N+1}P$ be the value sent by user "N+1" to server during authentication with server. After user N+1's authentication success, in step 614, the conference server announces admission of new user N+1 and sends the set $\{a_iP\}$ to everybody (either broadcast or individual unicast) including $Z_{N+1}$.

In step 616, users 1, N, N+1 send back $Xi=a_i\{a_{i+1}P-a_{i-1}P\}$ to the server; alternatively all of them could execute this step. In step 618, the conference server then shares the set $\{X_i\}$ with everybody (either broadcast or individual unicast) including $X_{N+1}$. The group key $(N+1)a_i(Z_{i-1})+(N)X_i+(N-1)X_{i+1}+\ldots+X_{i-2}$ is then recomputed in step 620. Observe that the group key changes after the new user is admitted.

FIG. 6C illustrates how a conference participant exits an ongoing conference, thus resulting in modified conference 600".

Assume that user 3 exits the call (it is to be understood that choice of user 3 is just an example). In step 622, the conference server announces which user exited the call (either broadcast or individual unicast). User ordering changes in step 624. Users 1 and 2 remain the same. User i becomes user i−1 for all i greater than or equal to 4. In step 626, user 4 (who is now user 3) re-computes $X_i$ and shares this contribution with the conference server. In step 628, the conference shares the set $\{X_i\}$ with all participants. In step 630, the participants recompute group key $(N-1)a_i(Z_{i-1})+(N-2)X_i+(N-3)X_{i+1}+\ldots+X_{i-2}$. Again, observe that the group key changes after a participant exits the call.

Principles of the invention also provide an extension to the conferencing management techniques described above. The extension involves lawful interception of conference messages.

Suppose there are N participants in the conferencing system. Assume that participant N is "tainted" and law enforcement authorities have obtained a warrant to tap into calls to and from participant N. The choice of declaring participant N as tainted is just for illustration and makes the description easier to follow, and the solution is in no way limiting to declaring the N-th user as the tainted user.

Prior to the conference call, the LI server (recall in FIG. 5) approaches the KMS corresponding to participant N and obtains the private key of participant N. This will allow the LI server to pretend to be participant N during the group key exchange process and execute all the steps in FIG. 6A except participant N's contributions are replaced with contributions from the LI server. In particular, the LI server will substitute $Z_{LI}$ and $X_{LI}$ in place of $Z_N$ and $X_N$. The rest of the participants will not know the difference, and will compute a group key, call it GK'.

Next, the LI server works with the conference server, and replaces $Z_1$ and $X_1$ with $Z_{LI}$ and $X_{LI}$ in all communications with participant N. This will imply participant N will compute a group key different from GK'. Call this new key GK".

Note that in the step above, the LI server could have replaced $Z_i$ and $X_i$ with $Z_{LI}$ and $X_{LI}$ for any participant, and the choice of i=1 is only for illustration.

After the call is set up, any communication from participants 1 through N−1 will be encrypted using GK'. Since the LI server knows GK', it can then intercept the communication, decrypt it, following which it will re-encrypt it with GK" and send it to participant N. Conversely, any communication from participant N will be encrypted using GK" which will be intercepted by the LI server, then decrypted using GK", re-encrypted using GK', and sent through to participants 1 through N−1.

III. IMS Embodiments

In the following section, the above general principles of MIKEY_MAKE and its extensions are applied to an IP Multimedia Subsystem (IMS) environment. That is, the multimedia communication system in this section is considered to be an IMS network. IMS standards are described, for example, in 3GPP Technical Specifications TS 23.218, TS 23.228, TS 24.228, TS 24.229, and TS 24.930, the disclosures of which are incorporated by reference herein We first describe an architectural framework for IMS media plane security, specifically key management, based on which various features and use cases can be derived.

At the core of the solution, is the identity-based encryption (IBE) concept, similar to RFC 5091, RFC 5408 and RFC 5409, the disclosures of which are incorporated by reference herein.

However, these RFCs do not provide authentication and suffer from an inherent key escrow problem. We address these problems, by extending basic IBE to include the Identity Based Authenticated Key Exchange (IBAKE) protocol that provides mutual authentication, eliminates passive key escrow, and provides perfect secrecy of keys. While IBAKE is the basic protocol construct, we use MIKEY as the protocol container for key delivery.

One key idea about the inventive IMS solution framework is that, we re-use the proposed architecture including a KMS, but notably we do not require these KMS servers to be always on-line. In other words, in the proposed framework, KMSs are offline servers that communicate with end-user clients periodically (e.g., once a month) to create a secure identity based encryption framework, while the on-line transactions between the end-user clients (for media plane security) are based on an IBAKE framework which allows the participating clients to exchange key components in an asymmetric identity based encryption framework. This framework, in addition to eliminating passive escrow, allows for end-user clients to mutually authenticate each other (at the IMS media plane layer) and provides perfect forwards and backwards secrecy.

Observe that the KMS to client exchange is used sparingly (e.g., once a month)—hence the KMS is no longer required to be a high availability server, and in particular different KMSs do not have to communicate with each other (across operator boundaries). Moreover, given that asymmetric identity based encryption framework is used, the need for costly Public Key Infrastructure (PKI) and all the operational costs of certificate management and revocation is eliminated. Additionally, various IMS media plane features are securely supported—this includes secure forking, retargeting, deferred delivery, pre-encoded content, media clipping, and anonymity.

Extensions of the solution allow for secure conferencing applications, where an IMS conference application server authenticates users into a call but all participants of the call decide on a group key (with contributions from everybody) while the conference server itself does not learn the group key. Moreover, the group key can be modified to account for new participants and participants who exit a call. An additional feature of the IMS-based key management framework is that, despite the elimination of passive key escrow, it supports legally sharing security credentials with law enforcement using the concept of active escrow.

FIG. 7 provides a schematic of the architecture along with the entities involved in an example end-to-end key exchange protocol in the IMS media plane. It is understood that since the IMS architecture is well-known, the functional components depicted in FIG. 7 are not described in detail. Reference may be made to the IMS standards for detailed explanation of their functions. Note that, as is known, CSCF refers to a call session control function whereby P-CSCF is a proxy CSCF and S-CSCF is a serving CSCF. NAF refers to a network application function.

In the scenario illustrated, two IMS capable end user phones are engaged in an end-to-end (e2e) key exchange to secure communications in the application layer. Note that the illustration includes offline transactions between a UE (user equipment) and a KMS as well as online transactions between the UEs through IMS.

Observe that the UEs and the KMS share a pre-configured security association, wherein users can establish secure connections with the key management server and wherein mutual authentication is provided. One natural example in the context of 3GPP systems, is the use of Generalized Bootstrap Architecture (see, e.g., 3GPP TS 33.220, the disclosure of which is incorporated by reference herein). In FIG. 7, the transactions between the KMS and a UE are enabled through a BSF (bootstrapping server function) and recall that this transaction is performed sparingly (e.g., once a month). Note that if GBA is unavailable, other types of credentials such as IKEv2 with pre-shared keys or certificates (see, e.g., IETF RFC 4306, the disclosure of which is incorporated by reference herein) can be used for establishing this mutual authentication between the user and the KMS.

During this transaction, the UE presents it's subscription credentials following which the KMS generates a set of private keys (used in IBAKE). If this transaction is performed once a month, then the KMS may choose to generate one key for each day. The number of keys, and the frequency of this exchange is a matter of policy and it may be tied to the subscription. This flexibility is especially useful for prepay customers.

Note that rather than a single KMS, two different KMSs may be involved; one for user A, i.e., KMS_A, and one for user B, i.e., KMS_B. However, KMS_A and KMS_B do not have to communicate with each other. This scenario is especially applicable in inter-operator scenarios.

We now give a short summary of exchanges involved in the MIKEY-IBAKE in the IMS context.

Suppose A, B are the two users that are attempting to authenticate and agree on a key. At the same time, A and B represent their corresponding identities, which by definition also represent their public keys. Let $H_1(A)=Q_A$ and $H_1(B)=Q_B$ be the respective points on the elliptic curve corresponding to the public keys. In effect, one could refer to $Q_A$ and $Q_B$ as the public keys as well, since there is a one-to-one correspondence between the identities and the points on the curve obtained by applying $H_1$. Let x be a random number chosen by A, and let y be a random number chosen by B. Encryption below refers to identity based encryption as described above in section I.

The IMS-based MIKEY-IBAKE protocol exchange includes the following steps (with reference to components shown in FIG. 7):

1. IMS UE belonging to user A bootstraps with the BSF to be able to establish a secure connection with the KMS which acts as a NAF. This allows the BSF to authenticate the user and the user to indirectly authenticate the KMS. If GBA cannot be used, the IMS UE connects and authenticates to the KMS and establishes a shared key, based on a pre-established security association.

2. The IMS UE engages in a MIKEY exchange with the KMS and requests a secret key (or multiple secret keys, e.g., one for each day).

3. The KIVIS generates the media secret key(s) for IMS UE of user A and sends it to the user A.

4. The IMS UE of user A computes xP (i.e., P added to itself x times as a point on E, using the addition law on E) encrypts it using B's public key, and transmits it to IMS UE of user B.

5. The IMS core detects the INVITE and handles it in such a way that a network function, if authorized, can get access to the session key. This step in particular is applicable only to support the active escrow feature needed to satisfy any lawful intercept requirement.

6. The IMS UE of user B receives the INVITE including encrypted xP. IMS UE of user B decrypts the message and obtains xP. Subsequently B computes yP, and encrypts the pair {xP, yP} using the public key of IMS UE of user A and then transmits it in a response message to A.

7. Upon receipt of this message, IMS UE of user A decrypts the message and obtains yP. Subsequently IMS UE of user A encrypts yP using B's public key and sends it back in response conformation message to B. Following this, both A and B compute xyP as the session key.

8. At this point, the IMS UE of user B accepts the invitation and use of media security.

Observe that A chose x randomly, and received yP in the second step of the protocol exchange. This allows A to compute xyP by adding yP to itself x times. Conversely B chose y randomly, and received xP in the first step of the protocol exchange. This allows B to compute xyP by adding xP to itself y times.

Some advantageous properties that flow from the MIKEY-IBAKE protocol are as follows.

Mutual authentication. Observe that the contents of the payload in steps 4 and 7 are encrypted using B's public key. Hence B, and only B, can decrypt these messages. Similarly, the contents of the message in step 6 can be decrypted by A and only A. Also note that steps 6 and 7 allow B and A to authenticate with each other (by proving that the message was decrypted correctly). This novel feature allows for A and B to mutually authenticate each other without the aid of any on-line server or certificate authority.

Perfect secrecy. Observe that x and y are random. Hence the session key xyP is fresh and bears no relation to past or future transactions.

Elimination of passive escrow. Observe that, while the KMS (or a pair of KMSs) can decrypt the messages in the exchange, it is hard to determine xyP given xP and yP. The hardness assumption relies on the Diffie-Hellman problem over elliptic curves. Also note that, the curves used for IBE are KMS specific, and moreover need not be the same as the curve used to generate the session key. This flexibility offers a wide number of choices, and also eliminates any coordination needed between KMSs.

Identity management. As described above, to encrypt a message a sender uses a recipient's public key, generated using the identity (or one of the identities) of the recipient. The identity of the recipient may be in format that specifies a specific user, a group of users or any user. The naming of users and user groups may follow normal IMS conventions and may be extended with use of wildcards. In certain scenarios involving group applications, it may be natural to have a policy allowing all recipients in the group to use the secret key corresponding to the identity of that particular user group. For example, for enterprise users, it may be natural to have as a default that secret keys corresponding to identity of enterprise are distributed to all enterprise users. Note that due to the properties of identity based encryption, although all the users belonging to a group possibly possess the secret key of that group, all users nevertheless can not obtain the session key established between a sender and some other user belonging to that same group. To ensure that polices are enforced, it is also necessary that a public user identity can be securely bound to an IMS UE. In other words, it is important to the identity used by the user to authenticate against the KMS to a (set of) public identity.

We now discuss extensions of MIKEY-IBAKE protocol to various IMS-based use case scenarios. Note that these extensions were generally described above in section II. There description below is in the context of an IMS environment.

A. Lawful intercept (LI) through active escrow

To be able to provide a clear copy of intercepted communication, the following conditions have to be fulfilled:

1. It must be possible to intercept the traffic (both signalling and media).

2. The session keys used for actual traffic protection have to be available. To make the session keys available, KMS functions/services are required.

As stated above, the actual session keys used for traffic protection are generated between the sender and the recipient, thus not known by the KMS. Therefore, an active escrow solution is needed. In this scenario, for the KMS to obtain a session key between users A and B, it needs to establish an active session key between itself and user A and another simultaneous active session between itself and user B. The KMS pretends to be B towards A, and conversely. This 'man-in-the-middle' role played by the KMS is referred to as active escrow and similar to the methods used in a PKI environment where a Certificate Authority generates 'fake certificates' and sits in the middle of the exchange. The difference between the technique used in conventional CA's and our approach to active escrow is that the KMS does not have to generate fake keys.

With signaling traffic routed via the home network, intercept of the signaling traffic in the home network can be done at SIP (Session Initiation Protocol) server(s). This signaling traffic then needs to be routed towards the appropriate KMS in order for this KMS to establish the needed session keys with the corresponding users. In roaming situations, as the SIP signaling traffic normally is confidentiality protected between the IMS UE and the P-CSCF and considering that in current deployments the P-CSCF is located in the home network, the SIP signaling is only available in encrypted format at bearer level in the visited network.

For roaming scenarios, while encrypted SIP signaling and content will always be available, in order to intercept SIP signaling and decrypt the content of communication, there has to be an interoperation agreement between the visited network and the entity handling KMS. Typically, the KMS will reside in the home network so that, for LI performed by the visited network, cooperation with the home network is needed.

In line with LI standards, when the VPLMN (Visited Public Land Mobile Network) is not involved in the encryption, only encrypted content would be available for LI in the VPLMN.

B. Users in Different KMS Domains

Users in different KMS domains will have their secret keys generated by different KMSs. As a result, a different set of public parameters (e.g., cryptographic material) can be used to generate public and secret keys for users in different KMS domains. To ensure proper encryption/decryption, a sender and recipient need to know exact public parameters used by each side. Nevertheless, if a user in one KMS domain needs to establish a secure call to a user in another KMS domain the involved KMSs do not need to cooperate. As in any identity based cryptographic protocol, or for that matter any public key protocol, we can safely assume that public parameters needed for the exchange are publicly available or exchanged.

C. End-to-Middle Scenarios

In end-to-middle scenarios, media protection is between an IMS UE and a network entity. In a scenario when the call is initiated from an IMS UE, the set up of the call would follow the same principles as for an end-to-end protected call. The initiating IMS UE uses the identity of the network entity (e.g., MGWC—media gateway control) to encrypt xP as described above and sends it together with the INVITE. The MGWC intercepts the message, and generates yP in the same way as a receiving IMS UE would have done. The MGWC then sets up the MGW to have media security towards the IMS UE. The media traffic is forwarded in plain in the PSTN (public switched telephone network).

For incoming calls to IMS UEs, the MGWC checks that at least one terminal registered for the intended recipient has registered media security capabilities and preferences. If there is no media protection-capable terminal, the call is forwarded in plain. Otherwise, the MGWC chooses y and generates yP. The MGWC then inserts the encrypted yP (using the IMS UEs identity) in the INVITE and initiates use of media security in the MGW on the media traffic between the MGW and the IMS terminal.

D. Key Forking

In this section, forking is discussed for the case of IMS-based MIKEY-IBAKE. Recall that forking is generally described above in the context of FIG. 2. Forking is the delivery of a request (e.g., INVITE message) to multiple locations. This happens when a single IMS user is registered more than once. An example of forking is when a user has a desk phone, PC client, and mobile handset all registered with the same public identity.

Figure 8:
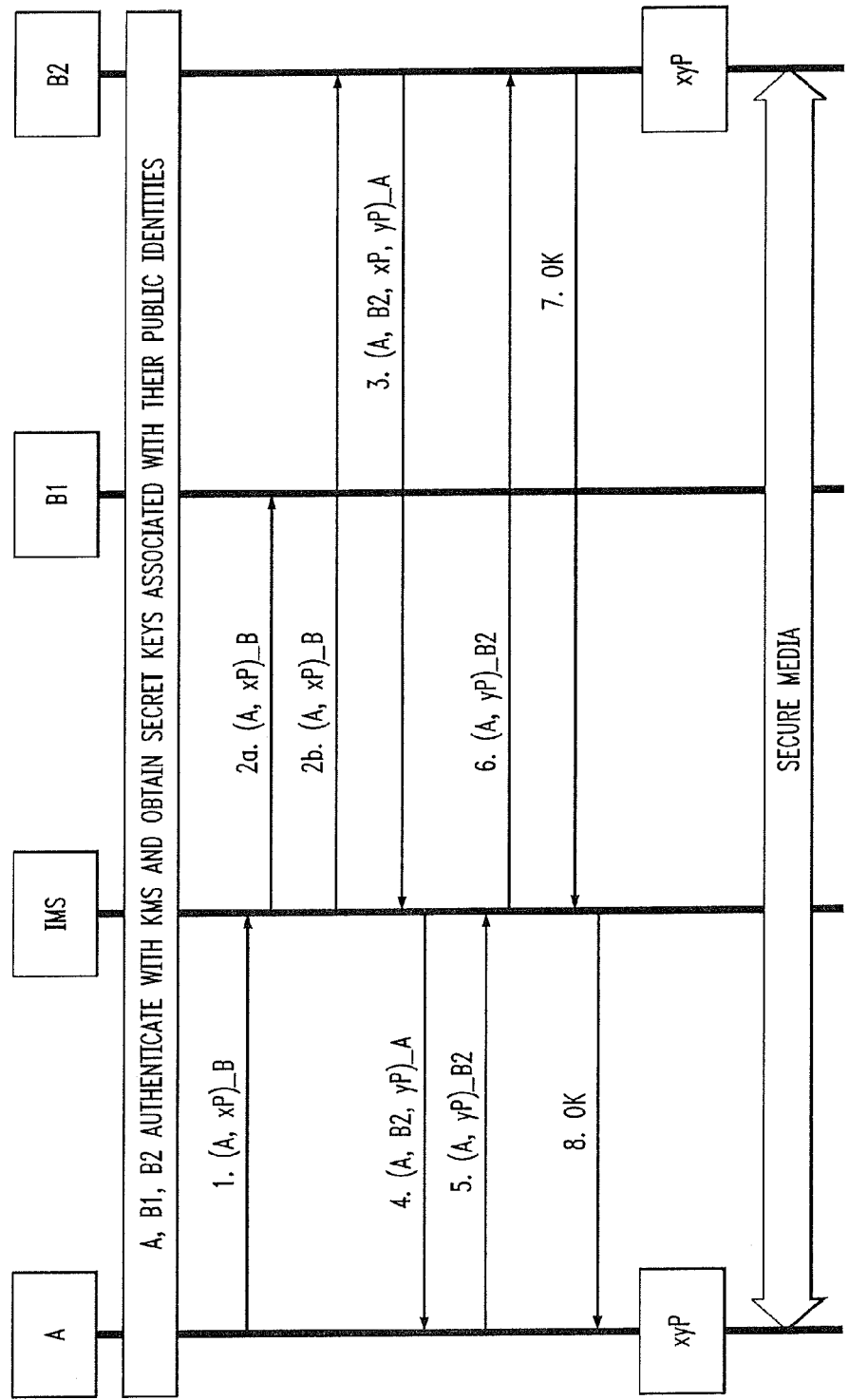
FIG. 8 illustrates a key forking methodology according to an IMS-based embodiment of the invention.

In the example depicted below and shown in the context of steps 1 through 8 of FIG. 8, assume that IMS UE of user B has multiple contact addresses registered with a single public user identity B. In other words, both B1 and B2 obtain a secret key corresponding to a public identity B. In this case, if IMS UE of user A wants to contact the IMS UE of user B, the request will be delivered to both B1 and B2. Assuming that B2 responds to a call, B2 first decrypts the message received using secret key associated with the identity B. B2 then chooses random y and sends to A a message including yP and its identity B2 encrypted using A's public identity. Upon receiving this message, user A decrypts it, realizes that it is communicating with user B2, and sends a response confirmation message including received yP encrypted using B2's public identity.

Observe that B1 is able to decrypt the message received from user A encrypted using B's public identity, therefore is able to obtain xP. However, it is not able to decrypt the message sent from B2 as it is encrypted using A's identity. Thus, user B1 is not able to obtain yP. Also note that even if B1 was able to obtain yP, it would still not be able to compute xyP. Note that in FIG. 7, (M)_X denotes that the message M is encrypted using the identity of X.

E. Redirection

In this section, session redirection (retargeting) is discussed for the case of IMS-based MIKEY-IBAKE. Recall that redirection is generally described above in the context of FIG. 3. Session redirection is a scenario in which a functional element decides to redirect the call to a different destination. Session redirection enables the typical services of "Session Forward Unconditional," "Session Forward Busy," "Session Forward Variable," "Selective Session Forwarding," and "Session Forward No Answer."

There are two basic scenarios of session redirection. In scenario one, a functional element (e.g., S-CSCF) decides to redirect the session using SIP REDIRECT method. In other words, the functional element passes the new destination information to the originator. As a result, the originator initiates a new session to the redirected destination provided by the functional element. For the case of MIKEY-IBAKE, this means that the originator will initiate a new session with the identity of the redirected destination.

In the second scenario, a functional element decides to redirect the session without informing the originator. A common scenario is one in which the S-CSCF of the destination user determines that the session is to be redirected. The user profile information obtained from the HSS (home subscriber server) by the 'Cx-pull' during registration may contain complex logic and triggers causing session redirection.

Figure 9:
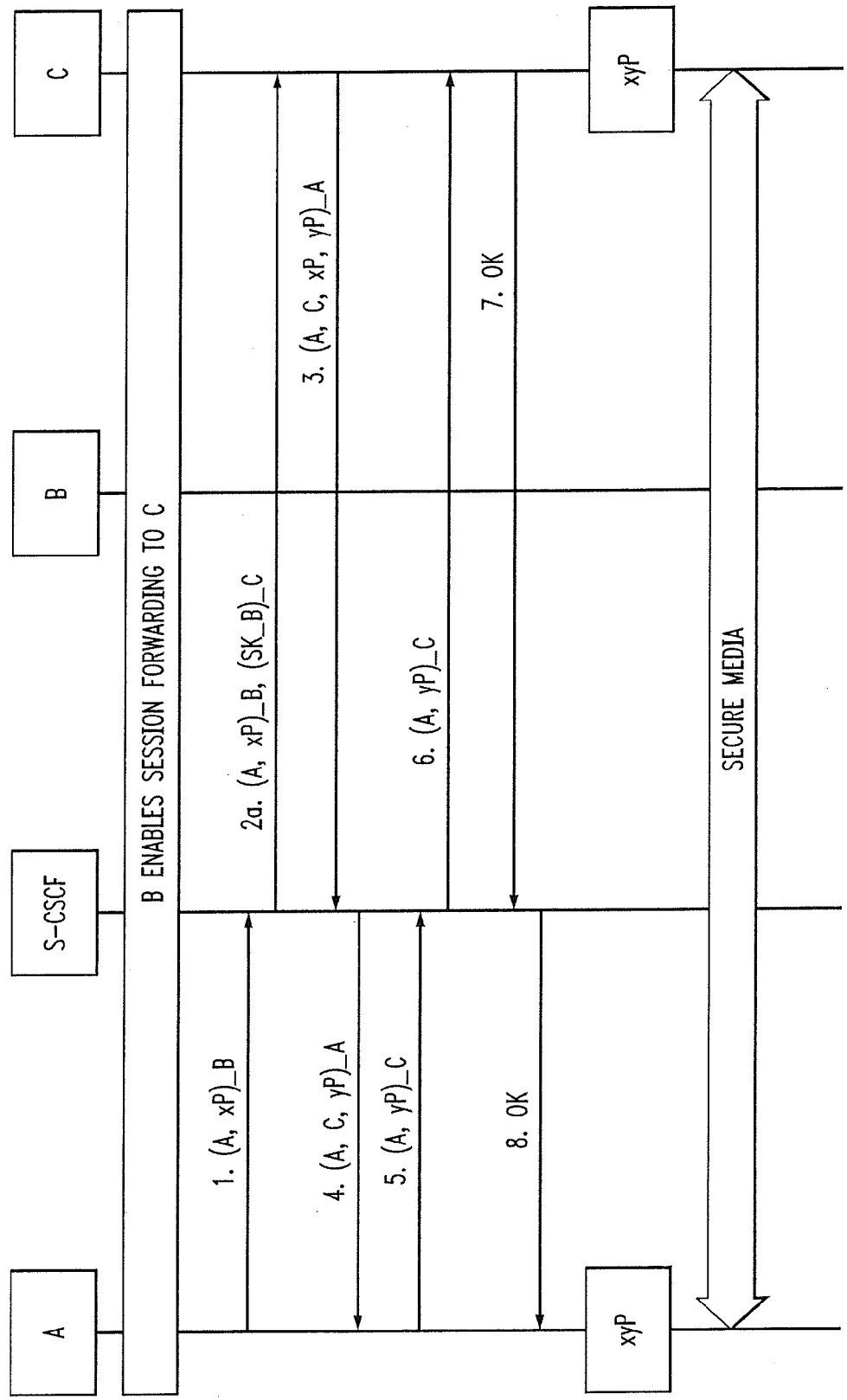
FIG. 9 illustrates a redirection methodology according to an IMS-based embodiment of the invention.

In the example depicted in steps 1 through 8 of FIG. 9, without loss of generality, it is assumed that the user B set up session forwarding to the user C. In this case, user B includes in its user profile its secret key SK_B encrypted using C's identity. Therefore, once the S-CSCF receives the message from user A and decides that the message needs to be redirected, it includes B's encrypted key in the message redirected to the user C. Upon receiving the message, the user C encrypts the secret key, and in turn, the message from A. User C then chooses random y and sends to A a message including yP and its identity C encrypted using A's public identity. Upon receiving this message, user A decrypts it, realizes that it is communicating to user C, and sends a response conformation message including received yP encrypted using C's public identity. In FIG. 9, (M)_X denotes that the message M is encrypted using the identity of X.

F. Deferred Delivery

In this section, deferred delivery is discussed for the case of IMS-based MIKEY-IBAKE. Recall from section II that deferred delivery is a type of service such that the session content can not be delivered to the destination at the time that it is being sent (e.g., the destination user is not currently online or decides not to answer the call). Nevertheless, the sender expects the network to deliver the message as soon as the recipient becomes available. A typical example of deferred delivery is voicemail.

Below, two basic scenarios of deferred delivery for the case of IMS-based MIKEY-IBAKE are presented. Reference may be made back to FIG. 4A for the first scenario and FIG. 4B for the second scenario.

In the first scenario, user A and B's mailbox perform mutual authentication before they agree on the key to be used for decrypting the content of the message intended for deferred delivery, while in the second scenario mutual authentication is not performed.

In the first scenario (again, reference may be made back to FIG. 4A where the functional element 402 is an IMS server), it is assumed that the user A is trying to reach the user B, who is currently not available, therefore the call is forwarded to the B's 'voicemail' (more generally, deferred delivery server). Following the MIKEY-IBAKE protocol, the message received by B's mailbox is encrypted using B's identity, therefore B's mailbox will not be able to decrypt it. B's mailbox chooses random y and computes yP and send its identity and yP IBE-encrypted to the user A. The user A recognizes that B did not receive the message and that the actual recipient was not able to decrypt the message sent in the first step by the lack of its identity and xP. Therefore, the user sends a new message containing A's identity, B's mailbox identity, xP and yP all IBE-encrypted using B's mailbox identity. Upon reception of this message, B's mailbox accepts "sK" as the session key for the message intended for B and return A's identity and xP to the user A to complete the authentication.

Observe that sK is encrypted using B's public key; hence mailbox B cannot decrypt this message and obtain "sK." Subsequently, when B is online and checks 'voicemail' (checks with the deferred delivery server), B can obtain the encrypted value of sK from the mailbox server. Note that B may have to authenticate with the mailbox to obtain the key—this could be based on existing authentication mechanisms already in place.

In the second scenario (again, reference may be made back to FIG. 4B where the functional element 402 is an IMS server), the same assumption holds—the user A is trying to reach the user B, which is currently not available, therefore the call is forwarded to B's voicemail. However, in this case, B's mailbox and user A do not perform the authentication. Instead, B's mailbox just accepts sK as the session key and returns an OK message to the user A to confirm it.

G. Group and Conference Calls

In this section, the key management protocol of MIKEY-IBAKE is extended to group and conference calls. Note that the advantageous properties that flow from the MIKEY-IBAKE protocol are therefore realized in a conferencing environment. Recall that conferencing was generally described above in the context of FIGS. 6A through 6C. Note that the IMS example in FIG. 10 is for N=3.

Figure 10:
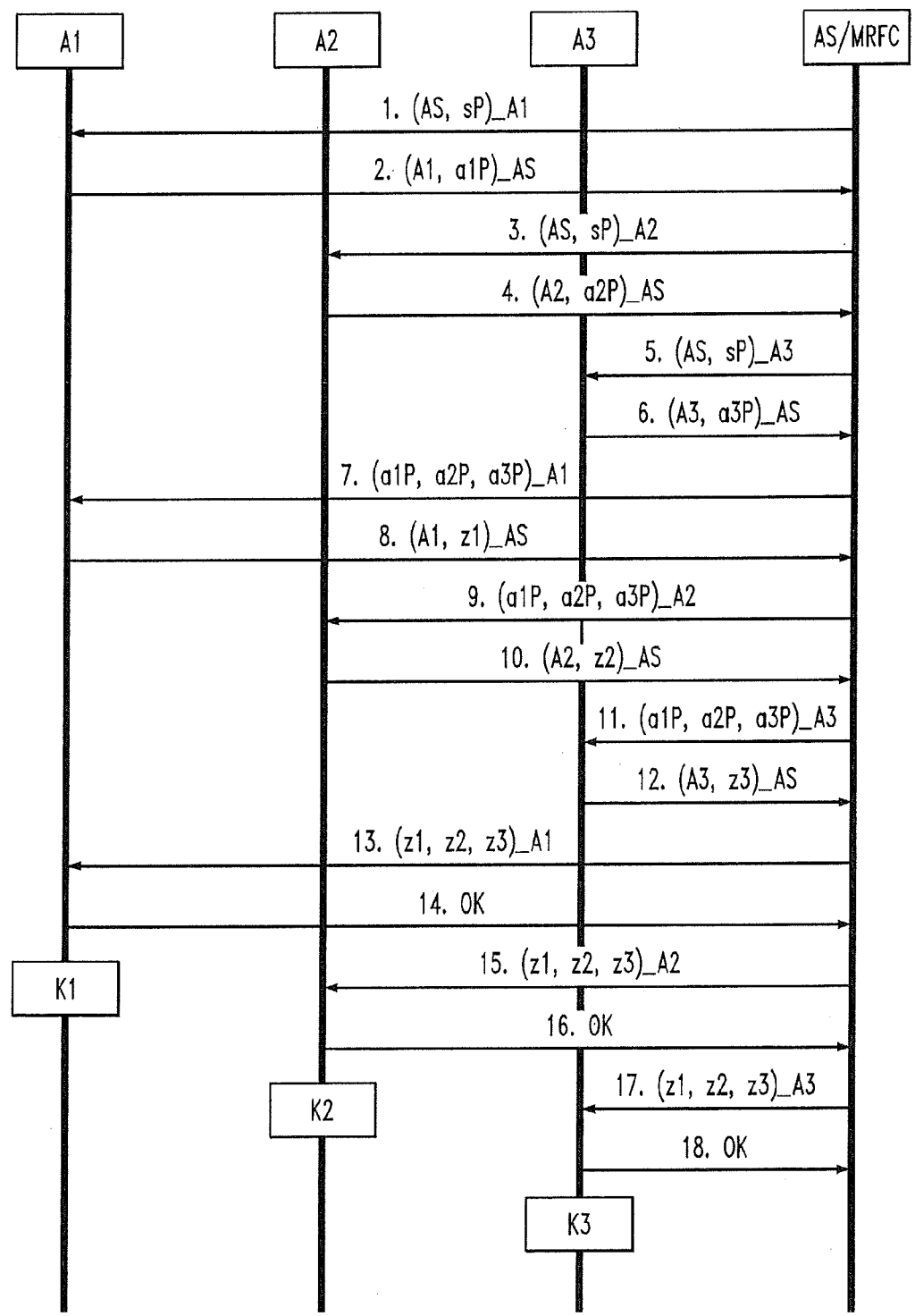
FIG. 10 illustrates a conferencing methodology with three participants according to an IMS-based embodiment of the invention.

In the IMS-based scenario depicted in steps 1 through 18 of FIG. 10, it is assumed that there is a conference server (AS/MRFC—application server/multimedia resource function controller) that invites users to the conference call. This could be a result of, for example, previously received REFER request from another user. An alternative approach would be to delegate this function to one of the users (e.g., conference chair). Although this alternative is not shown in FIG. 10, the approach would be similar and the computation of the group key would be the same.

In the description below, it is assumed that all messages are IBE encrypted (e.g., if a user Y is sending a message M to a user X, then the message M is encrypted using X's identity) using the appropriate identity. In FIG. 10, this is denoted as (M)_X meaning the message M is IBE encrypted using the identity of X.

In the first set of exchanges with the conference server, users $A_1$, $A_2$, and $A_3$ choose random $a_1$, $a_2$, and $a_3$ respectively and each user $A_i$ sends $w_i = a_i P$ to the conference server. In the second set of exchanges the conference server sends all $a_i P$'s to every user, while each user sends $z_i = a_i(a_{i+1} - a_{i-1})P$. In the final exchange, the conference server sends all $z_i$'s to each user. Upon this, all conference participants are able to compute the group key as follows: $K_i = 3a_i w_{i-1} + 2z_i + z_{i+1}$.

Note that $K_1 = K_2 = K_3$. Also note, while users $A_1$, $A_2$, and $A_3$ are able to generate the group key, the conference server is not since while it knows the $z_i$'s and $w_i$'s, only individual users know their randomly chosen $a_i$.

For simplicity reasons, above discussion focuses on three conference call participants. However, the above procedures can be generalized to n participants. In case of n participants, the group key is generated as $K_i = n a_i w_{i-1} + (n-1) z_i + (n-2) z_{i+1} + \ldots + z_{i-2}$, where $w_i$ and $z_i$ are as defined above.

One of the important features of the protocol is that the group key changes every time a new user is admitted or an existing user exits the call. This ensures that new users do not learn the group key before they were added to the call, and users who leave the call prematurely do not gain access to the conversations after the call.

Observe that when a new user is added, and there are N users in the system already, then there will be a total of N+1 users in the system. When these users are placed in a circle, then the user next to the N-th user is now the (N+1)th user (and not the 1st user, which was the case prior to admitting the N+1th user). The protocol to admit a new user works as follows:

The new user authenticates with the conference server using IBAKE, similar to every user. This allows the user to be admitted (and authorized to the call), and the new user is guaranteed of joining the correct conference (via authentication of the conference server).

Let $z_{N+1} = a_{N+1} P$ be the value chosen by the new user during authentication.

The conference server then sends the set $\{z_i\}$ for all i=1 to N+1 to all users, either broadcast or unicast. This allows all users to learn of the new user, and determine their new neighbors. Observe that the neighbor list changes only for users 1, N, and N+1.

Users 1, N, and N+1 then compute their corresponding value of w, and send it back to the conference server (individually).

The server then sends an updated list of $\{w_i\}$ to all users.

All participants then recompute the group key using the same relation as above, except N is replaced by N+1 and the new values of $z_i$ and $w_i$.

When a user exits the conference call, then no new authentication procedures have to be executed, but the group key changes. The procedure works as follows:

The conference server learns about the user exiting the conference call.

Subsequently, the conference server informs everybody of this event and information pertaining to which user (not just identity, but also includes the order) exited the call. In order to simplify matters, the conference server may resend the new list $\{z_i\}$ This allows all users to rediscover their neighbors, and recompute $w_i$, if necessary.

All those participants remaining in the call, for whom $w_i$ changed, will inform the conference server their new value.

The conference server then sends the updated list $\{w_i\}$.

All participants then recompute the group key using the same relation as above, except N is replaced by N−1 and the new values of $w_i$ are used.

IV. Illustrative Computing System

FIG. 11 illustrates a generalized hardware architecture 1100 of a network environment and communication devices in the form of computing devices suitable for implementing a secure key management protocol between two entities according to the present invention. While FIG. 11 shows only two entities, it is to be understood that other entities can have the same configuration. Thus, in terms of the secure key management protocols described above, the two entities may be initiator 102-I (a first party or A) and responder 102-R (a second party or B). However, KMSs, conference servers, LI servers, functional elements, additional client devices (parties) and additional servers may be implemented with the same architecture as shown in a computing device of FIG. 11. Thus, for the sake of simplicity, all the computing devices (communication devices) that may participate in the protocols of the invention are not shown in FIG. 11.

As shown, A's computing device designated 1102 and B's computing device designated 1104 are coupled via a network 1106. The network may be any network across which the devices are able to communicate, for example, as in the embodiments described above, the network 1106 could include a publicly-accessible wide area communication network such as a cellular communication network operated by a network operator (e.g., Verizon, AT&T, Sprint). However, the invention is not limited to a particular type of network. Typically, the devices could be client machines. Examples of client devices that may be employed by the parties to participate in the protocols described herein may include, but are not limited to, cellular phones, smart phones, desktop phones, personal digital assistants, laptop computers, personal computers, etc. However, one or more of the devices could be servers. Thus, it is to be understood that the communication protocol of the present invention is not limited to the case where the computing systems are client and server, respectively, but instead is applicable to any computing devices comprising the two network elements.

As would be readily apparent to one of ordinary skill in the art, the servers and clients may be implemented as programmed computers operating under control of computer program code. The computer program code would be stored in a computer readable storage medium (e.g., a memory) and the code would be executed by a processor of the computer. Given this disclosure of the invention, one skilled in the art could readily produce appropriate computer program code in order to implement the protocols described herein.

Nonetheless, FIG. 11 generally illustrates an exemplary architecture for each computer system communicating over the network. As shown, device 1102 comprises I/O devices 1108-A, processor 1110-A, and memory 1112-A. Device 1104 comprises I/O devices 1108-B, processor 1110-B, and memory 1112-B. It should be understood that the term "processor" as used herein is intended to include one or more processing devices, including a central processing unit (CPU) or other processing circuitry, including but not limited to one or more signal processors, one or more integrated circuits, and the like. Also, the term "memory" as used herein is intended to include memory associated with a processor or CPU, such as RAM, ROM, a fixed memory device (e.g., hard drive), or a removable memory device (e.g., diskette or CDROM). In addition, the term "I/O devices" as used herein is intended to include one or more input devices (e.g., keyboard, mouse) for inputting data to the processing unit, as well as one or more output devices (e.g., CRT display) for providing results associated with the processing unit.

Accordingly, software instructions or code for performing the methodologies of the invention, described herein, may be stored in one or more of the associated memory devices, e.g., ROM, fixed or removable memory, and, when ready to be utilized, loaded into RAM and executed by the CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of managing a conference between two or more communication devices in a communication system, the method comprising:

sending from a conference management element to each of the communication devices a set comprising random key components of the communication devices, each random key component having been received by the conference management element from a respective one of the communication devices during a key authentication operation;

receiving at the conference management element from each of the communication devices a random group key component, each random group key component having been computed by a corresponding respective one of the communication devices via a computation based on 1) a random number used by the respective communication device during the key authentication operation and 2) the random key components of a subset of others of the communication devices; and sending from the conference management element to each of the communication devices a set comprising the random group key component of another communication device; and receiving an encrypted message from a first of the communication devices directed to a second of the communication devices, wherein the encrypted message is encrypted based on the random group key components computed by said another communication device.

2. The method of claim 1, wherein the conference management element comprises one of the communication devices.

3. The method of claim 1, wherein the conference management element comprises a conference server.

4. The method of claim 1, wherein an $i^{th}$ one of the communication devices computes a random group key as: $Na_i + (N-1)X_i + (N-2)X_{i+1} + \ldots + X_{i-2}$, where N represents the total number of the communication devices, $a_i$ represents the random number used by the $i^{th}$ one, $Z_i$ represents the random key component computed by the $i^{th}$, $X_i$ represents the random group key component computed by the $i^{th}$ one, and i represents an index of a conference ordering for the $i^{th}$ communication device in the N-party conference with i−1=N when i=1 and i+1=1 when i=N.

5. The method of claim 4, wherein the random key component for a $i^{th}$ one is computable by a computation represented as: $a_i P$, where P is a point selected from a group of points on an elliptic curve over a finite field associated with the key authentication operation.

6. The method of claim 4, wherein the random group key component for the $i^{th}$ one is computable by a computation represented as: $a_i(a_{i+1}P - a_{i-1}P)$, where $a_i$ is the random number selected by a $i^{th}$ one, $a_{i+1}P$ is the random key component sent to the conference management element by the communication device immediately following the $i^{th}$ one in the conference ordering, $a_{i-1}P$ is the random key component sent to the conference management element by the communication device immediately preceding the $i^{th}$ one in the conference ordering, and P is a point selected from a group of points on an elliptic curve over a finite field associated with a cryptographic key exchange protocol.

7. The method of claim 1, wherein the conference management element participates in a mutual authentication operation with each of the communication devices.

8. The method of claim 7, wherein the conference management element admits a given communication device to the conference on the condition that (i) the given communication device is authenticated by the conference management element; and (ii) the given communication device is confirmed to belong to a conference authorization list.

9. The method of claim 1, further comprising obtaining, by the communication devices, respective private keys from one or more key management services.

10. The method of claim 1, wherein the conference management element obtains a private key from a key management service.

11. The method of claim 1, wherein the computation of the group key is based on use of at least one point selected from a group associated with a cryptographic key exchange protocol.

12. The method of claim 1, wherein the group key changes on the condition that 1) a new communication device joins the conference, or 2) one of the communication devices leaves the conference.

13. The method of the claim 1, wherein an intercept server intercepts conference messages to and from a given one of the communication devices.

14. The method of claim 13, wherein the intercept server obtains from a key management service a private key of the given one.

15. The method of claim 14, wherein the intercept server performs the random key component and random group key component message exchanges on behalf of the given one using a random key component and a random group key component computed by the intercept server.

16. The method of claim 15, wherein the intercept server, in cooperation with the conference management element, replaces the random key component set and the random group key component set in communications with the given one such that the given one can compute a group key different from the group key used by others of the communication devices.

17. The method of claim 1, wherein one or more of the messages are encrypted using an identity based encryption operation.

18. The method of claim 1, wherein the encrypted message is encrypted based on the random group key components computed by all of the two or more communication devices.

19. The method of claim 1, wherein the sending and receiving include a radio-frequency (RF) link.

20. The method of claim 1, wheren all of the communication devices compute a same random group key used to encrypt messages sent by each communication device.

21. An apparatus, comprising:
a processor at a conference management element;
a computer-readable non-transitory storage medium operably coupled to said processor and including instructions that when executed by the processor configure the processor to operate the conference management element to:
send from the conference management element to each of two or more communication devices a set comprising random key components of at least some of the other communication devices;
receive two or more random group key components, each random group key component having been computed by a respective one of the communication devices via a computation based on 1) a random number generated by the respective communication device, and 2) the random key components of a subset of others of the communication devices; and
send from the conference management element to each of the communication devices a set comprising the random group key components of at least some of the communication devices; and
receive an encrypted message from a first of the communication devices directed to a second of the communication devices,
wherein the encrypted message is encrypted based on at least some of the random group key components computed by the communication devices.

22. A method comprising:
configuring a communication device to receive from a conference management element a set comprising random key components of two or more communication devices;
configuring the communication device to send to the conference management element a random group key component, wherein the random group key component is computed by the communication device via a computation based on a random number used by the communication device during a key authentication operation and the random key components of a subset of others of the two or more communication devices;
configuring the communication device to receive from the conference management element a set comprising the random group key components of at least some of the two or more communication devices; and
configuring the communication device to compute a group key which is the same group key computable by the others of the two or more communication devices for use in communicating with each other communication device through the conference management element;
wherein messages sent from the communication device to the conference management element and received from the conference management element by the communication device are encrypted based on at least some of the random group key components computed by the two or more communication devices.

23. The method of claim 22, wherein the communication device is an $i^{th}$ one of N communication devices, and the $i^{th}$ one is configured to compute the group key $K_i$ by the relation: $K_i = Na_i(Z_{i-1}) + (N-1)X_i + (N-2)X_{i+1} + \ldots + X_{i-2}$, where $a_i$ represents the random number used by the $i^{th}$ one, $Z_i$ represents the random key component computed by the $i^{th}$ one, $X_i$ represents the random group key component computed by the $i^{th}$ one, and i represents a number of a conference ordering for the $i^{th}$ one in the N-party conference with i−1=N when i=1 and i+1=1 when i=N.

24. The method of claim 23, wherein the random key component for the $i^{th}$ one is computable by a computation represented as: $a_iP$, where P is a point selected from a group of points on an elliptic curve over a finite field associated with the key authentication operation.

25. The method of claim 23, wherein the random group key component for the $i^{th}$ one is computable by a computation represented as: $a_i(a_{i+1}P - a_{i-1}P)$, where $a_{i+1}$ is the random number used by the communication device immediately following the $i^{th}$ one in the conference ordering, $a_{i-1}$ is the random number used by the communication device immediately preceding the $i^{th}$ one in the conference ordering, and P is a point selected from a group of points on an elliptic curve over a finite field associated with a cryptographic key exchange protocol.

26. The method of claim 22, wherein the encrypted message is encrypted based on the random group key components computed by all of the two or more communication devices.

27. The method of claim 22, wherein the sending and receiving include a radio-frequency (RF) link.

28. A communication device, comprising:
a processor;
a computer-readable non-transitory storage medium operably coupled to said processor and including instructions that when executed by the processor configure the processor to operate the communication device to:
receive from a conference management element a set comprising random key components of the communication device and at least one other communication device;

send to the conference management element a random group key component, wherein the random group key component is computed based on a random number, known to the processor but not the at least one other communication device, and the random key component of the the least one other communication device;

receive from the conference management element a set comprising the random group key components of the communications device and the at least one other communication device; and compute from the set a group key usable to encrypt communications with the at least one other communication device via the conference management element.

29. The communications device of claim 28, wherein the encrypted message is encrypted based on the random group key components computed by all of the communication devices in a conference.

30. The communications device of claim 28, wherein the sending and receiving include a radio-frequency (RF) link.

* * * * *

UNITED STATES PATENT AND TRADEMARK OFFICE
CERTIFICATE OF CORRECTION

PATENT NO.         : 9,049,024 B2  
APPLICATION NO.    : 13/596823  
DATED              : June 2, 2015  
INVENTOR(S)        : Ganapathy S. Sundaram Page 1 of 1

It is certified that error appears in the above-identified patent and that said Letters Patent is hereby corrected as shown below:

In the specification:

Column 14, line 13, please change "$\{X_1\}$" to --$\{X_i\}$--

In the claims:

Claim 1, column 24, line 9, after "communication devices;" please delete "and"

Claim 4, column 24, line 26, after "$Na_i$" please insert --$(Z_{i-1})$--

Claim 4, column 24, line 30, after "computed by the $i^{th}$" please insert --one--

Claim 5, column 24, line 37, before "$i^{th}$ one is computable" please change "a" to --the--

Claim 6, column 24, line 44, after "selected by" please change "a" to --the--

Claim 21, column 25, line 57, please delete "and"

Claim 23, column 26, line 32, please change "$K_{i\,=\,Na_i}(Z_{i-1})$" to --$K_i = Na_i(Z_{i-1})$--

Claim 23, column 26, line 34, please change "one ," to --one,--

Claim 23, column 26, line 36, please change "one ," to --one,--

Signed and Sealed this  
Eighth Day of December, 2015

Michelle K. Lee  
*Director of the United States Patent and Trademark Office*